United States Patent
Lee

(10) Patent No.: US 7,778,212 B2
(45) Date of Patent: Aug. 17, 2010

(54) METHOD AND APPARATUS FOR MULTICAST TRANSMISSION OF PACKET DATA IN A MOBILE COMMUNICATION SYSTEM

(75) Inventor: Sung-Won Lee, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1301 days.

(21) Appl. No.: 10/449,091

(22) Filed: Jun. 2, 2003

(65) Prior Publication Data

US 2003/0223393 A1 Dec. 4, 2003

(30) Foreign Application Priority Data

Jun. 3, 2002 (KR) ............... 10-2002-0031179

(51) Int. Cl.
*H04H 20/71* (2008.01)
(52) U.S. Cl. ............... 370/312; 370/335; 370/342; 370/390; 370/392; 370/432; 455/522
(58) Field of Classification Search ................ 370/310, 370/312, 328, 335, 342, 390, 432, 392, 503; 455/522
See application file for complete search history.

(56) References Cited

U.S. PATENT DOCUMENTS

| | | | | |
|---|---|---|---|---|
| 5,887,252 | A * | 3/1999 | Noneman | 455/463 |
| 6,104,709 | A * | 8/2000 | Rinchiuso et al. | 370/335 |
| 6,741,575 | B1 * | 5/2004 | Zhang et al. | 370/329 |
| 6,947,434 | B2 * | 9/2005 | Hundscheidt et al. | 370/401 |
| 6,965,580 | B1 * | 11/2005 | Takagi et al. | 370/312 |
| 7,054,297 | B1 * | 5/2006 | Smith | 370/338 |
| 7,474,431 | B2 * | 1/2009 | Yamano et al. | 358/1.15 |
| 2002/0057663 | A1 | 5/2002 | Lim | |
| 2002/0114353 | A1 * | 8/2002 | Montojo et al. | 370/503 |
| 2002/0143951 | A1 * | 10/2002 | Khan et al. | 709/227 |
| 2003/0026240 | A1 * | 2/2003 | Eyuboglu et al. | 370/349 |
| 2003/0053478 | A1 * | 3/2003 | Hsu et al. | 370/441 |
| 2003/0198224 | A1 * | 10/2003 | Lee et al. | 370/392 |
| 2004/0198404 | A1 * | 10/2004 | Attar et al. | 455/522 |
| 2005/0021833 | A1 * | 1/2005 | Hundscheid et al. | 709/236 |
| 2005/0198130 | A1 * | 9/2005 | Bosloy et al. | 709/204 |

FOREIGN PATENT DOCUMENTS

| | | |
|---|---|---|
| EP | 0 828 355 A2 | 3/1998 |
| EP | 0 999 656 A1 | 5/2000 |

(Continued)

*Primary Examiner*—Kwang B Yao
*Assistant Examiner*—Jeffrey M Rutkowski
(74) *Attorney, Agent, or Firm*—Roylance, Abrams, Berdo & Gooman, L.L.P.

(57) ABSTRACT

An apparatus and method for multicast transmission of packet data in a mobile communication system. To multicast packet data to a group of MSs, a BS divides a plurality of MSs within its cell area into a plurality of multicast groups. Here, the MSs of each multicast group are to receive the same data. The BS assigns a MMAC index to each multicast group. Upon receipt of a multicast traffic channel request message from an MS, the BS transmits to the MS a traffic channel assignment message with the MMAC index of a multicast group to which the MS belongs and transmits forward packet data to the MS on a traffic channel corresponding to the MMAC index.

12 Claims, 53 Drawing Sheets

FOREIGN PATENT DOCUMENTS

| | | |
|---|---|---|
| EP | 1 006 740 A2 | 6/2000 |
| EP | 1077539 A | 2/2001 |
| JP | 2001-053675 | 2/2001 |
| KR | 10-20000037821 A | 7/2000 |
| KR | 10 2000 0059683 A | 10/2000 |
| KR | 10-20020037792 A | 5/2002 |
| WO | WO 00/51373 | 8/2000 |
| WO | WO0178321 A2 | 10/2001 |

* cited by examiner

|  | Preamble | Forward Traffic | Forward RPC Bit | Reverse Traffic |
|---|---|---|---|---|
| Unicast | MAC Index | MAC Index | MAC Index | UATI |
| Broadcast | BMAC Index | BMAC Index with BATI | — | — |

FIG.6
(PRIOR ART)

|  | Preamble | Forward Traffic | Forward RPC Bit | Reverse Traffic |
|---|---|---|---|---|
| Unicast | DMAC Index | DMAC Index | DMAC Index | Primary UATI |
| Interactive Multicast | MMAC Index | MMAC Index | DMAC Index | Primary UATI |
| | | | | Primary UATI with Classifier |
| Non-Interactive Multicast | MMAC Index | MMAC Index | — | Primary UATI |
| | | | | Primary UATI with Classifier |
| Simultaneous | DMAC Index & (MMAC Index or BMAC Index) | DMAC Index & (MMAC Index or BMAC Index) | DMAC Index | Primary & Secondary UATI |
| | | | | Primary UATI with Classifier |
| Broadcast | BMAC Index | BMAC Index with BATI | — | — |

FIG.17

| Field | Length(bits) |
|---|---|
| MessageID | 8 |

FIG.26

| Field | Length(bits) |
|---|---|
| MessageID | 8 |
| GroupID | 16 |

FIG.27

| Field | Length(bits) |
|---|---|
| MessageID | 8 |
| TransactionID | 8 |
| RequestReason | 4 |
| GroupCallType | 3 |
| Reserved | 1 |

FIG.28

| Field | Length(bits) |
|---|---|
| MessageID | 8 |
| MessageSequence | 8 |
| ChannelInclued | 1 |
| Channel | 0 or 24 |
| FrameOffset | 4 |
| DRCLength | 2 |
| DRCChannelGain | 6 |
| AckChannelGain | 6 |
| NumMulticastPilots | 4 |

NumMulticast Pilots occurences of the following fields

| Field | Length(bits) |
|---|---|
| PilotPN | 9 |
| SofterHandoff | 1 |
| MACIndex | 6 |
| DRCCover | 3 |
| RABLength | 2 |
| RABOffset | 3 |
| Reserved | Variable |

FIG.29

| Field | Length(bits) |
|---|---|
| MessageID | 8 |
| MessageSequence | 8 |
| ChannelInclued | 1 |
| Channel | 0 or 24 |
| FrameOffset | 4 |
| DRCLength | 2 |
| DRCChannelGain | 6 |
| AckChannelGain | 6 |
| NumUnicastPilots | 4 |

NumUnicastPilots occurences of the following fields

| Field | Length(bits) |
|---|---|
| PilotPN | 9 |
| SofterHandoff | 1 |
| MACIndex | 6 |
| DRCCover | 3 |
| RABLength | 2 |
| RABOffset | 3 |

| NumMulticastPilots | 4 |
|---|---|

NumMulticastPilots occurences of the following fields

| Field | Length(bits) |
|---|---|
| PilotPN | 9 |
| SofterHandoff | 1 |
| MACIndex | 6 |
| DRCCover | 3 |
| RABLength | 2 |
| RABOffset | 3 |
| Reserved | Variable |

FIG.30

| Field | Length(bits) |
|---|---|
| MessageID | 8 |
| MessageSequence | 8 |
| ChannelIncluded | 1 |
| Channel | 0 or 24 |
| FrameOffset | 4 |
| DRCLength | 2 |
| DRCChannelGain | 6 |
| AckChannelGain | 6 |
| NumUnicastPilots | 4 |
| NumUnicastPilot occurences of the following fields ||
| PilotPN | 9 |
| SofterHandoff | 1 |
| MACIndex | 6 |
| DRCCover | 3 |
| RABLength | 2 |
| RABOffset | 3 |
| NumMulticastPilots | 4 |
| NumMulticastPilot occurences of the following fields ||
| PilotPN | 9 |
| SofterHandoff | 1 |
| MACIndex | 6 |
| DRCCover | 3 |
| RABLength | 2 |
| RABOffset | 3 |
| SecondaryUATIIncluded | 1 |
| SubnetIncluded | 1 |
| SecondaryUATISubnetMask | 0 or 8 |
| SecondaryUATI104 | 0 or 104 |
| SecondaryUATIColorCode | 8 |
| SecondaryUATI024 | 24 |
| UpperOldSecondaryUATILength | 4 |
| Reserved | Variable |

FIG. 31

| Field | Length(bits) |
|---|---|
| MessageID | 8 |
| MessageSequence | 8 |

FIG.32

| Field | Length(bits) |
|---|---|
| MessageID | 8 |
| TransactionID | 8 |

FIG.33

| Field | Length(bits) |
|---|---|
| MessageID | 8 |
| MessageSequence | 8 |
| Reserved1 | 7 |
| SubnetIncluded | 1 |
| SecondaryUATISubnetMask | 0 or 8 |
| SecondaryUATI104 | 0 or 104 |
| SecondaryUATIColorCode | 8 |
| SecondaryUATI024 | 24 |
| UpperOldSecondaryUATILength | 4 |
| Reserved2 | 4 |

FIG.34

| Field | Length(bits) |
|---|---|
| MessageID | 8 |
| MessageSequence | 8 |
| Reserved1 | 4 |
| UpperOldSecondaryUATILength | 4 |
| UpperOldSecondaryUATI | 8xUpperOldSecondaryUATILength |

FIG.35

| Field | Length(bits) |
|---|---|
| MessageID | 8 |
| TransactionID | 8 |

FIG.38

| Field | Length(bits) |
|---|---|
| MessageID | 8 |
| MessageSequence | 8 |
| Reserved1 | 7 |
| SubnetIncluded | 1 |
| MATISubnetMask | 0 or 8 |
| MATI104 | 0 or 104 |
| MATIColorCode | 8 |
| MATI024 | 24 |
| UpperOldMATILength | 4 |
| Reserved2 | 4 |

FIG.39

| Field | Length(bits) |
|---|---|
| MessageID | 8 |
| MessageSequence | 8 |
| Reserved1 | 7 |
| SubnetIncluded | 1 |
| MATISubnetMask | 0 or 8 |
| MATI104 | 0 or 104 |
| MATIColorCode | 8 |
| MATI024 | 24 |
| UpperOldMATILength | 4 |
| Reserved2 | 4 |
| SecondaryUATIIncluded | 1 |
| Reserved3 | 3 |
| SubnetIncluded | 1 |
| SecondaryUATISubnetMask | 0 or 8 |
| SecondaryUATI104 | 0 or 104 |
| SecondaryUATIColorCode | 8 |
| SecondaryUATI024 | 24 |
| UpperOldMATILength | 4 |
| Reserved4 | 7 |

FIG.40

| Field | Length(bits) |
|---|---|
| MessageID | 8 |
| MessageSequence | 8 |
| Reserved | 4 |
| UpperOldMATILength | 4 |
| UpperOldMATI | 8xUpperOldMATILength |

FIG.41

| Field | Length(bits) |
|---|---|
| MessageID | 8 |
| MessageSequence | 8 |
| ChannelIncluded | 1 |
| Channel | 0 or 24 |
| FrameOffset | 4 |
| DRCLength | 2 |
| DRCChannelGain | 6 |
| AckChannelGain | 6 |
| NumPilots | 4 |
| NumPilots occurances of the following fields | |
| PilotPN | 9 |
| SofterHandoff | 1 |
| MACIndex | 6 |
| DRCCover | 3 |
| RABLength | 2 |
| RABOffset | 3 |
| MATIIncluded | 1 |
| SubnetIncluded | 1 |
| MATISubnetMask | 0 or 8 |
| MATI104 | 0 or 104 |
| MATIColorCode | 8 |
| MATI024 | 24 |
| UpperOldMATILength | 4 |
| Reserved | Variable |

FIG.42

| Field | Length(bits) |
|---|---|
| MessageID | 8 |
| MessageSequence | 8 |
| ChannelIncluded | 1 |
| Channel | 0 or 24 |
| FrameOffset | 4 |
| DRCLength | 2 |
| DRCChannelGain | 6 |
| AckChannelGain | 6 |
| NumUnicastPilots | 4 |

NumUnicastPilots occurences of the following fields

| | |
|---|---|
| PilotPN | 9 |
| SofterHandoff | 1 |
| MACIndex | 6 |
| DRCCover | 3 |
| RABLength | 2 |
| RABOffset | 3 |

| | |
|---|---|
| NumMulticastPilots | 4 |

NumUnicastPilots occurences of the following fields

| | |
|---|---|
| PilotPN | 9 |
| SofterHandoff | 1 |
| MACIndex | 6 |
| DRCCover | 3 |
| RABLength | 2 |
| RABOffset | 3 |

FIG. 43A

| | |
|---|---|
| SecondaryUATIIncluded | 1 |
| SubnetIncluded | 1 |
| SecondaryUATISubnetMask | 0 or 8 |
| SecondaryUATI104 | 0 or 104 |
| SecondaryUATIColorCode | 8 |
| SecondaryUATI024 | 24 |
| UpperOldSecondaryUATILength | 4 |

| | |
|---|---|
| MATIIncluded | 1 |
| SubnetIncluded | 1 |
| MATISubnetMask | 0 or 8 |
| MATI104 | 0 or 104 |
| MATIColorCode | 8 |
| MATI024 | 24 |
| UpperOldMATILength | 4 |
| Reserved | Variable |

FIG.43B

| | Preamble | Forward Traffic | Forward RPC Bit | Reverse Traffic |
|---|---|---|---|---|
| Unicast | DMAC Index | DMAC Index | DMAC Index | Primary UATI |
| Interactive Multicast | MMAC Index | MMAC Index with MATI | DMAC Index | Primary UATI / Primary UATI with Classifier |
| Non-Interactive Multicast | MMAC Index | MMAC Index with MATI | — | Primary UATI / Primary UATI with Classifier |
| Simultaneous | DMAC Index & (MMAC Index or BMAC Index) with MATI | DMAC Index & (MMAC Index or BMAC Index) with MATI | DMAC Index | Primary & Secondary UATI / Primary UATI with Classifier |
| Broadcast | BMAC Index | BMAC Index with BATI | — | — |

FIG.44

| | Preamble | Forward Traffic | Forward RPC Bit | Reverse Traffic |
|---|---|---|---|---|
| Unicast | DMAC Index | DMAC Index | DMAC Index | Primary UATI |
| Interactive Multicast | BMAC Index | BMAC Index with MATI | DMAC Index | Primary UATI / Primary UATI with Classifier |
| Non-Interactive Multicast | BMAC Index | BMAC Index with MATI | — | Primary UATI / Primary UATI with Classifier |
| Simultaneous | DMAC Index & BMAC Index | DMAC Index & BMAC Index with MATI | DMAC Index | Primary & Secondary UATI / Primary UATI with Classifier |
| Broadcast | BMAC Index | BMAC Index with BATI | — | — |

FIG.49

| MulticastChannelRate | 4 |

FIG.53

| Data Rate (kbps) | Slots Per Physical Layer Packet | d3 | d2 | d1 | d0 |
|---|---|---|---|---|---|
| 38.4 | 16 | 0 | 0 | 0 | 1 |
| 76.8 | 8 | 0 | 0 | 1 | 0 |
| 153.6 | 4 | 0 | 0 | 1 | 1 |
| 307.2 | 2 | 0 | 1 | 0 | 0 |
| 307.2 | 4 | 0 | 1 | 0 | 1 |
| 614.4 | 1 | 0 | 1 | 1 | 0 |
| 614.4 | 2 | 0 | 1 | 1 | 1 |
| 921.6 | 2 | 1 | 0 | 0 | 0 |
| 1,228.8 | 1 | 1 | 0 | 0 | 1 |
| 1,228.8 | 2 | 1 | 0 | 1 | 0 |
| 1,843.2 | 1 | 1 | 0 | 1 | 1 |
| 2,457.6 | 1 | 1 | 1 | 0 | 0 |

FIG.54

METHOD AND APPARATUS FOR MULTICAST TRANSMISSION OF PACKET DATA IN A MOBILE COMMUNICATION SYSTEM

BACKGROUND OF THE INVENTION

1. Field of the Invention

The present invention relates generally to a method and apparatus for providing a multicasting service in a CDMA (Code Division Multiple Access) system, and in particular, to a method and apparatus for supporting multicasting in a CDMA system providing a high-speed packet data service such as CDMA 1xEV-DO (Evolution-Data Only) and CDMA 1xEV-DV (Data and Voice).

2. Description of the Related Art

The existing IS-95A, IS-95B, and IS-95C systems are inefficient for data communications because they focus on voice service, thereby restricting data service. To solve this problem, two systems have been proposed by Qualcomm: the first is HDR (High Data Rate) i.e., 1xEV-DO, which is a data only technology, and the second is 1xEV-DV, which carries both data and voice. These two systems are ready for commercial deployment.

These high-speed data transmission technologies achieve Mbps-level data rates as defined in IMT-2000 (International Mobile Telecommunication-2000). Thus, real-time transmission of moving pictures and a multimedia download service are possible through a terminal like a video phone.

In general, data packets are unicast, broadcast, or multicast over a wired network from the perspective of transmitters and receivers. Unicast is a one-to-one transmission. For example, all typical Internet application programs are unicast. Broadcast is a one-to-many transmission in a subnetwork. Multicast is a data transmission from one or more transmitters to two or more receivers, as can be found in Internet video conferencing.

In a mobile communication system, especially CDMA 1xEV-DO and 1xEV-DV, data packets are only unicast or broadcast. As done over a wired network, unicast transmission is carried out from a base station (BS) to each individual mobile station (MS) and multicast transmission refers to simultaneous transmission of the same information from the BS to all MSs within the service area of the BS.

The configuration of a typical mobile communication system that unicasts or broadcasts data will be described with reference to FIGS. 1 to 11.

FIG. 1 illustrates a network configuration for the typical mobile communication system such as 1xEV-DO. Referring to FIG. 1, an MS 100 exchanges voice or data with BTSs (Base Transceiver Systems) 200 including BTS-a and BTS-b through a radio interface. A BSC (Base Station Controller) 300 controls the BTSs 200. In a CDMA 1xEV-DO system, an AT (Access Terminal) is equivalent to an MS and an AN (Access Network) is equivalent to both a BSC and a BTS. Thus, it can be appreciated that the both the MS and AN are used in the same sense and the BSC and the BTS are used in the same sense as the AN herein. The BSC 300 communicates for call connection with the Internet, PSTN (Public Switched Telephone Network), and PSDN (Public Switched Data Network) via a GW (GateWay)/MSC (Mobile Switching Center) 400. "GW" 400 is a logical name, as the entity is usually referred to as a PDSN (Packet Data Service Node), AGW (Access GateWay), or MGW (Media GateWay).

FIG. 2 is a block diagram of the BTS 200 illustrated in FIG. 1. Referring to FIG. 2, the BTS 200 is connected to the BSC 300 via a duplexing network interface 201 such as an NIC (Network Interface Card) or LIC (Line Interface Card). The network interface 201 is connected to a BTS switch (or router) 203. The network interface 201 interfaces data between the BTS 200 and the BSC 300. The BTS switch 203 switches received data under the control of a BTS controller 205. Thus, the BTS switch 203 is comprised of an intra-BTS switch (router).

The BTS controller 205 manages resources in the BTS 200. The BTS 200 further includes a plurality of channel cards 207; each of which is assigned to one user. Each channel card 207 controls traffic transmission between the BTS 200 and an MS in cooperation with a traffic controller 309 of the BSC 300. Specifically, the channel card 207 processes data received from an RF (Radio Frequency) module 209 and feeds the processed data to the BTS switch 203. The channel card 207 also processes data received from the BTS switch 203 and feeds the processed data to the RF module 209. For data transmission between the BTS 200 and the MS on radio channels, the RF module 209 upconverts the frequency of a signal received from each channel card 207 and transmits it in the air, or it downconverts an RF signal in a predetermined frequency band received from each MS and outputs it to a corresponding channel card 207.

An RF-scheduler processor 211, connected to the BTS switch 203, is used for efficient use of resources. It can be integrated into a channel card 207 or implemented as a separate processor.

FIG. 3 is a block diagram of the BSC 300 illustrated in FIG. 1. Referring to FIG. 3, the BSC 300 includes a duplexing network interface 301 connected to the GW/MSC 400, for interfacing data between the BSC 300 and the GW/MSC 400. It also includes a network interface 303 connected to the BTS 200, for interfacing data between the BSC 300 and the BTS 200. The network interfaces 301 and 303 are connected to a BSC switch (router) 305.

The BSC switch 305 takes charge of data routing and switching within the BSC 300. The BSC switch 305 transmits/receives data bi-directionally between the network interfaces 301 and 303. In the presence of data to be transmitted to a BSC controller 307, the BSC switch 305 switches the data to the BSC controller 307. In the presence of data to be transmitted to the traffic controller 307, the BSC switch 305 switches the data to the traffic controller 309.

The BSC controller 307 provides overall control to the BSC 300 and manages BSC 300 resources and part of BTS 200 resources.

The traffic controller 309 has an SDU/RLP (Selection and Distribution Unit/Radio Link Protocol) processor for traffic transmission/reception with a plurality of MSs. The SDU/RLP processor transmits traffic to a plurality of BTSs and combines data originated from the same MS as received from the BTSs. Although the SDU/RLP processor can be integrated into the GW 400, it is assumed herein that the SDU/RLP processor is positioned in the BSC 300. The SDU/RLP processor converts packet traffic received from the GW 400 to an error control protocol frame, prior to transmission to the BTSs 200.

FIG. 4 is a block diagram illustrating certain component parts of the BTS 200 and the BSC 300. Specifically, FIG. 4 illustrates an AN, which supports unicast transmission. The conventional AN which supports unicast transmission is comprised of a call control processor 401 and an SDU/RLP processor 405 in the BSC 300, and a call control processor 403, a unicast MAC (Medium Access Control) processor 407, and a MODEM 409 in the BTS 200. In FIG. 4, a solid line indicates a traffic path and a dotted line indicates a control information path.

Referring to FIG. 4, the BSC call control processor 401 and the BTS call control processor 403 perform call processing. They correspond to the BSC controller 307 and the BTS controller 205, respectively. Yet, the BSC call control processor 401 and the BTS call control processor 403 can be implemented in dedicated hardware. These call control processors establish a call and control the SDU/RLP processor 405 and the unicast MAC processor 407 to transmit forward traffic.

The unicast MAC processor 407 manages resources including MAC indexes and UATIs (Unicast Access Terminal Identifiers) and assigns them to MSs. The unicast MAC processor 407 delivers traffic received from the higher-layer SDU/RLP processor 405 together with a MAC index identifying a particular AT to the MODEM 409, and delivers traffic received from the MODEM 409 to the SDU/RLP processor 405.

The MODEM 409 is a device that supports a radio physical layer. It usually corresponds to the channel cards 207 in the BTS 200. The MODEM 409 encodes traffic received from the unicast MAC processor 407, spreads the received MAC index with a corresponding Walsh code, and modulates the traffic and MAC index, prior to transmission on a radio channel to the AT.

Thus the AN, but more particularly, the unicast MAC processor 407, manages AT-specific MAC indexes for unicast transmission of data to ATs. The MAC indexes indicate which Walsh code numbers (among Walsh codes #0 to #63) have been assigned to an AT, thus defining a MAC channel. Each AT is assigned to a traffic channel by receiving a MAC index specific to the AT from the AN. The AN assigns the traffic channel to the AT using the Walsh code corresponding to the MAC index. The AN then transmits data to the AT on the traffic channel, allowing only the AT to receive the data.

FIG. 5 specifies a procedure for assigning a traffic channel (i.e. MAC index) from the AN to the AT, for a unicast data transmission. The traffic channel assignment procedure is triggered as the AT receives a Page message from the AN, or requests a call setup to the AN, for call origination. It can also be performed periodically or when the AT, moving to a different service area, transmits a routing update (RouteUpdate) message to the AN to update its location information. The traffic channel assignment procedure follows a session setup procedure in which a UATI is assigned to the AT. The session setup procedure negotiates a protocol for communication between the AT and the AN when the AT is power-on. The UATI is a temporary identifier indicating the address of the AT being a data destination, which the AN assigns to the AT when setting up a session for the AT. A UATI assignment procedure is specified in 3GPP2 A.S0007-0 Version 2.0, Inter-Operability Specification (IOS) for High Rate Packet Data (HRPD) Access Network Interfaces 7.

Referring to FIG. 5, the AN transmits a Page message to the AT on a control channel (CC) and the AT reads the Page message with its UATI set as a destination address in the CC message in step 501. In step 503, the AT, which has received the Page message or intends to originate a call, transmits a ConnectionRequest message to the AN on an access channel (AC), requesting assignment of a traffic channel for a call connection. The ConnectionRequest message is loaded on the AC with a UATI-based long code mask (LCM), or the AT can transmit a RouteUpdate message to the AN, as described above.

In step 505, the AN transmits an AccessChannel ACK (ACAck) to the AT, notifying normal reception of the ConnectionRequest/RouteUpdate message. The AN then assigns a traffic channel for unicast transmission to the AT by transmitting a TrafficChannelAssignment message on the CC with the UATI of the AT set as a message destination in step 507. The traffic channel assignment is equivalent to transmission of a MAC index, that is, assignment of a Walsh code to the AT. After receiving the MAC index from the AN by the TraffcChannelAssignment message, the AT can identify its data transmitted on a traffic channel with the Walsh code corresponding to the MAC index from the AN.

The AT transmits null data to the AN on a reverse traffic channel (RTC) which is long code masked according to its UATI in step 509. The AN transmits to the AT an RTCAck message with its UATI on the CC or a forward traffic channel (FTC), notifying normal reception of the RTC in step 511. In step 513, the AT transmits a TrafficChannelComplete message to the AN on an RTC which is long code masked according to its UATI, notifying successful completion of the traffic channel assignment.

FIG. 6 illustrates an example of radio channel information that the AN manages when it unicasts data to the AT using the MAC index assigned to the AT. With reference to FIGS. 6 to 11, MAC index-based unicast transmission will be described in detail below.

First, a description will be made of forward unicast transmission referring to FIGS. 6 and 7. FIG. 7 conceptually illustrates forward transmission from the AN to the AT.

Unicast forward data is comprised of a preamble, an FTC packet, and reverse power control (RPC) bits. The preamble is usually all 0s, providing information such as timing to a receiver before reception of actual data. The traffic channel packet is traffic information delivered to the receiver. An RPC channel is a sub-channel of a MAC channel. The RPC bits on the RPC channel are used for power control of an RTC.

Referring to FIG. 7, a preamble 701 is covered with a 32 symbol bi-orthogonal Walsh code according to a MAC index assigned to a destination AT. A traffic channel packet 703 is spread with Walsh codes indicated by the MAC index prior to transmission to the AT. RPC bits 705 are also covered with a Walsh code according to the MAC index.

FIGS. 9, 10 and 11 are block diagrams of respective components for processing the traffic channel data, preamble, and RPC bits prior to unicast transmission.

Referring to FIG. 9, an encoder 901 encodes an FTC packet and outputs a code sequence including a plurality of bit streams. The code sequence is scrambled with a scrambling code generated from a scrambler 903. A channel interleaver 905 interleaves the scrambled sequence. A modulator 907 modulates the interleaved sequence in a predetermined modulation method. A puncturer 909 punctures the modulation symbols to achieve a desired data rate and a symbol demultiplexer (DEMUX) 911 demultiplexes the punctured I and Q data streams into 16 parallel I and Q data sets. A Walsh coverer 913 multiplies each of the data sets by one of 16 Walsh covers corresponding to a MAC index assigned to a destination AT. Thus, the Walsh-covered traffic packet is output on 16 Walsh channels 915. A Walsh chip level summer 917 adds all the I and Q signals of the Walsh channels 915 together at the chip level as the final signals.

Referring to FIG. 10, a signal point mapper 1001 maps 0s and 1s of a preamble signal to +1s and −1s, respectively. A Walsh spreader 1003 then spreads the preamble signal with a Walsh code according to the MAC index. After being repeated in a sequence repeater 1005, the spread preamble signal is transmitted in time division multiplexing (TDM) to the AT.

Referring to FIG. 11, MAC channel RPC bits are spread with a Walsh code according to the MAC index after processing in a signal point mapper 1101 and a reverse channel gain controller 1103.

A reverse link transmission will now be described with reference to FIGS. 6 and 8. An AN distinguishes ATs by their UATIs. Each AT transmits data long-code-masked according to UATI to the AN so that the AN identifies the AT by the UATI.

As illustrated in FIG. 6, the AN transmits system information to all ATs within its service area on a CCS that the ATs can identify. The CC uses a broadcast MAC (BMAC) index and a recipient address for a system parameter message delivered on the CC is defined with a broadcast access terminal identifier (BATI). For example, the ATs receive a message with BATI(0,0) among messages delivered on the CC with BMAC Index 0.

Thus far, unicast data transmission and broadcast data transmission have been described in the context of the traditional 1xEV-DV system supporting high-speed data transmission.

If the same data is to be transmitted to a plurality of ATs, the unicast transmission scheme requires multiple transmissions of a data packet to the ATs, thereby decreasing network efficiency. As the number of the ATs increases, this problem becomes serious.

Alternatively, broadcast transmission of the data packet leads to unnecessary delivery of the data packet to unintended ATs. Therefore, there is a need for minimizing transmission redundancy-caused waste of network resources by introducing multicast transmission as found in a conversational Internet function such as video conferencing.

SUMMARY OF THE INVENTION

It is, therefore, an object of the present invention to provide a multicast transmission apparatus and method for grouping a plurality of MSs and transmitting the same information simultaneously to the MSs of a particular group in a mobile communication system supporting high-speed data transmission.

It is another object of the present invention to provide an apparatus and method for grouping a plurality of MSs and additionally defining information that identify the groups for a physical layer in a mobile communication system supporting high-speed data transmission.

It is a further object of the present invention to provide a multicast transmission apparatus and method for grouping a plurality of MSs and assigning the same traffic channel to the MSs of the same group in a mobile communication system supporting data transmission.

It is still another object of the present invention to provide a multicast transmission apparatus and method for grouping a plurality of MSs and assigning the same traffic channel to the MSs of the same group, and thus transmitting data using the group address as a recipient in a mobile communication system supporting data transmission.

The above objects are achieved by an apparatus and method for multicast transmission of packet data in a mobile communication system. According to one aspect of the present invention, to multicast packet data to a group of MSs, a BS divides a plurality of MSs within its cell area into a plurality of multicast groups. Here, the MSs of each multicast group are to receive the same data. The BS then assigns a physical channel to each of the multicast groups.

According to another aspect of the present invention, to multicast packet data to a group of MSs, a BS divides a plurality of MSs within its cell area into a plurality of primary multicast groups. Here, the MSs of each primary multicast group are to receive the same data. The BS further divides the first multicast groups into secondary multicast groups. The BS then assigns a primary physical channel to each primary multicast group and a secondary physical channel to each secondary multicast group.

According to a further aspect of the present invention, to multicast packet data to a group of MSs, a BS divides a plurality of MSs within its cell area into a plurality of multicast groups. Here, the MSs of each multicast group are to receive the same data. The BS then assigns a primary physical channel to each multicast group and the same secondary physical channel to the multicast groups.

According to still another aspect of the present invention, to receive multicast packet data from a BS in a mobile communication system where a plurality of MSs within the cell area of the BS are divided into multicast groups and MSs of each multicast group receive the same data from the BS, an MS transmits a multicast traffic channel request message to the BS, receives from the BS a traffic channel assignment message with the MMAC index of a multicast group to which the MS belongs, and receives forward packet data from the BS on a traffic channel corresponding to the MMAC index.

According to yet another aspect of the present invention to receive multicast packet data from a BS in a mobile communication system where a plurality of MSs within the cell area of the BS are divided into multicast groups and MSs of each multicast group receive the same data from the BS, an MS transmits a temporary group address request message for multicast transmission to the BS. The MS then receives from the BS a temporary group address assignment message with the temporary group address of a multicast group to which the MS belongs. Here, a temporary group address is assigned to each multicast group. The MS receives forward packet data from the BS on a broadcast channel with the temporary group address of the MS set as a recipient.

In accordance with still a further aspect of the invention, a MAC controller is provided as a multicast transmission apparatus for dividing a plurality of MSs into multicast groups and transmitting the same data to MSs of the same multicast group in a BS. The MAC controller manages DMAC indexes assigned to the MSs for unicast transmission and MMAC indexes assigned to the multicast groups for multicast transmission. Upon receipt of a traffic channel request message from an MS, the MAC controller assigns a DMAC index to the MS or an MMAC index to a multicast group to which the MS belongs according to a requested packet transmission mode. A MAC processor outputs the DMAC index or MMAC index received from the MAC controller to a MODEM according to the requested packet data transmission mode. The MODEM transmits to the MS packet data on a traffic channel corresponding to the MAC index received from the MAC processor.

BRIEF DESCRIPTION OF THE DRAWINGS

The above and other objects, features and advantages of the present invention will become more apparent from the following detailed description when taken in conjunction with the accompanying drawings in which:

FIG. 6 is a table listing radio channel information for conventional unicast and broadcast transmission;

FIG. 17 illustrates radio channel information according to the embodiment of the present invention;

FIG. 26 illustrates the structure of a GroupPage message in the case where an AT belongs to one multicast group according to the embodiment of the present invention;

FIG. 27 illustrates the structure of the GroupPage message in the case where an AT belongs to a plurality of multicast groups according to the embodiment of the present invention;

FIG. 28 illustrates the structure of a GroupConnectionRequest message according to the embodiment of the present invention;

FIG. 29 illustrates the structure of a GroupTrafficChannelAssignment message for non-interactive multicast transmission according to the embodiment of the present invention;

FIG. 30 illustrates the structure of a GroupTrafficChannelAssignment message for interactive multicast/broadcast transmission according to the embodiment of the present invention;

FIG. 31 illustrates the structure of a GroupTrafficChannelAssignment message containing secondary UATI assignment information according to the embodiment of the present invention;

FIG. 32 illustrates the structure of a GroupTrafficChannelComplete message according to the embodiment of the present invention;

FIG. 33 illustrates the structure of a SecondaryUATIRequest message according to the embodiment of the present invention;

FIG. 34 illustrates the structure of a SecondaryUATIAssignment message according to the embodiment of the present invention;

FIG. 35 illustrates the structure of a SecondaryUATIComplete message according to the embodiment of the present invention;

FIG. 38 illustrates the structure of an MATIRequest message according to the second embodiment of the present invention;

FIG. 39 illustrates the structure of an MATIAssignment message in the case where a secondary UATI is assigned in a separate procedure according to the second embodiment of the present invention;

FIG. 40 illustrates the structure of an MATIAssignment message containing the secondary UATI according to the second embodiment of the present invention;

FIG. 41 illustrates the structure of an MATIComplete message according to the second embodiment of the present invention;

FIG. 42 illustrates the structure of a GroupTrafficChannelAssignment message by which an MATI is assigned according to the second embodiment of the present invention;

FIGS. 43A and 43B illustrate the structure of a GroupTrafficChannelAssignment message containing MATI and secondary UATI assignment information according to the second embodiment of the present invention;

FIG. 44 illustrates radio channel information according to the second embodiment of the present invention;

FIG. 49 illustrates radio channel information according to the third embodiment of the present invention;

FIG. 53 illustrates a MulticastChannelRate field according to the third embodiment of the present invention;

FIG. 54 illustrates a multicast forward channel rate table according to the third embodiment of the present invention.

DETAILED DESCRIPTION OF THE PREFERRED EMBODIMENTS

Certain embodiments of the present invention will be described herein below with reference to the accompanying drawings. In the following description, well-known functions or constructions are not described in detail since they would obscure the invention in unnecessary detail. While the embodiments of the present invention are applicable to CDMA mobile communication systems, the following description is made in the context of a 1xEV-DO system, for notational simplicity.

In accordance with the various embodiments of the present invention, a plurality of ATs are grouped for multicast transmission in a mobile communication system. An AN transmits a message or data simultaneously to the ATs of a particular group instead of transmitting it to the individual ATs separately. This is defined as multicast transmission. A different appellation can be used as long as it denotes the same transmission scheme.

ATs are grouped in two ways. The first group is defined by an AN that transmits a group list to the ATs and each AT selects a desired group. The second group is defined by an AN that groups the ATs according to their positions, similarly to grouping for a location based service. Aside from position, subscriber information (e.g. area, job, or age) can be considered to set multicast groups. Before describing multicast transmission of an embodiment of the present invention with reference to FIG. 12 and FIGS. 14 to 35, the structure of the AN will first be described below. And, following indices to be assigned to the mobile station are a dedicated MAC, a multicast MAC, and a broadcast MAC, etc.

Figure 1:
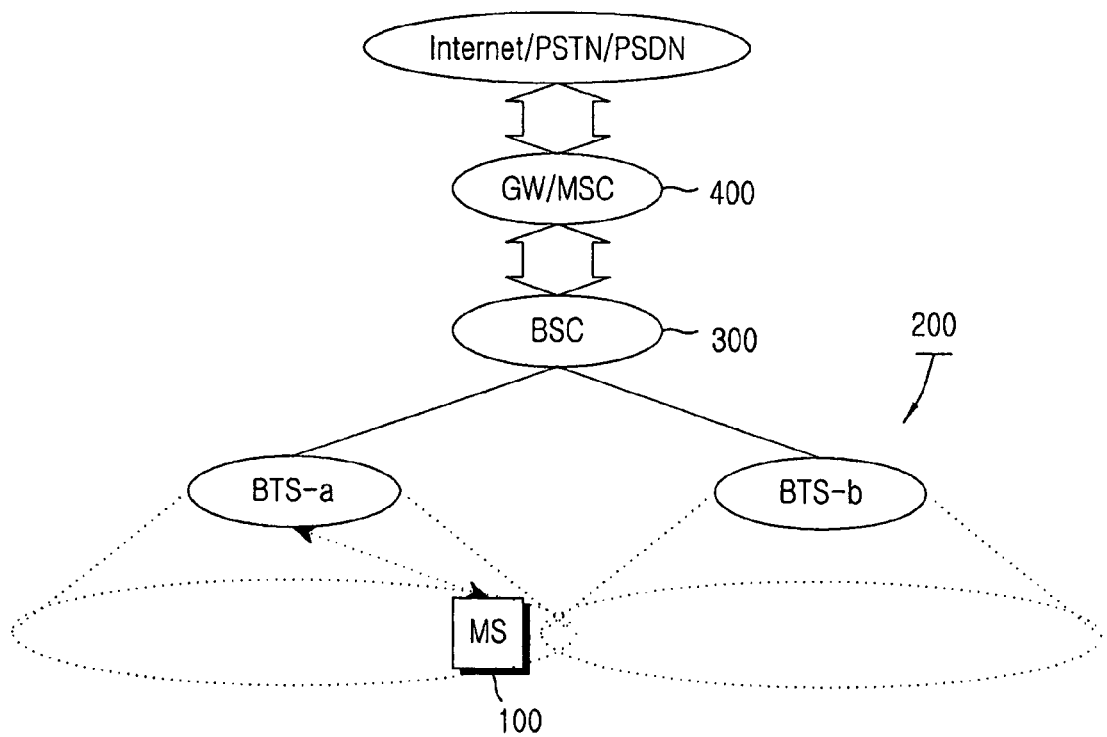
FIG. 1 illustrates a network configuration for a typical mobile communication system.
Figure 2:
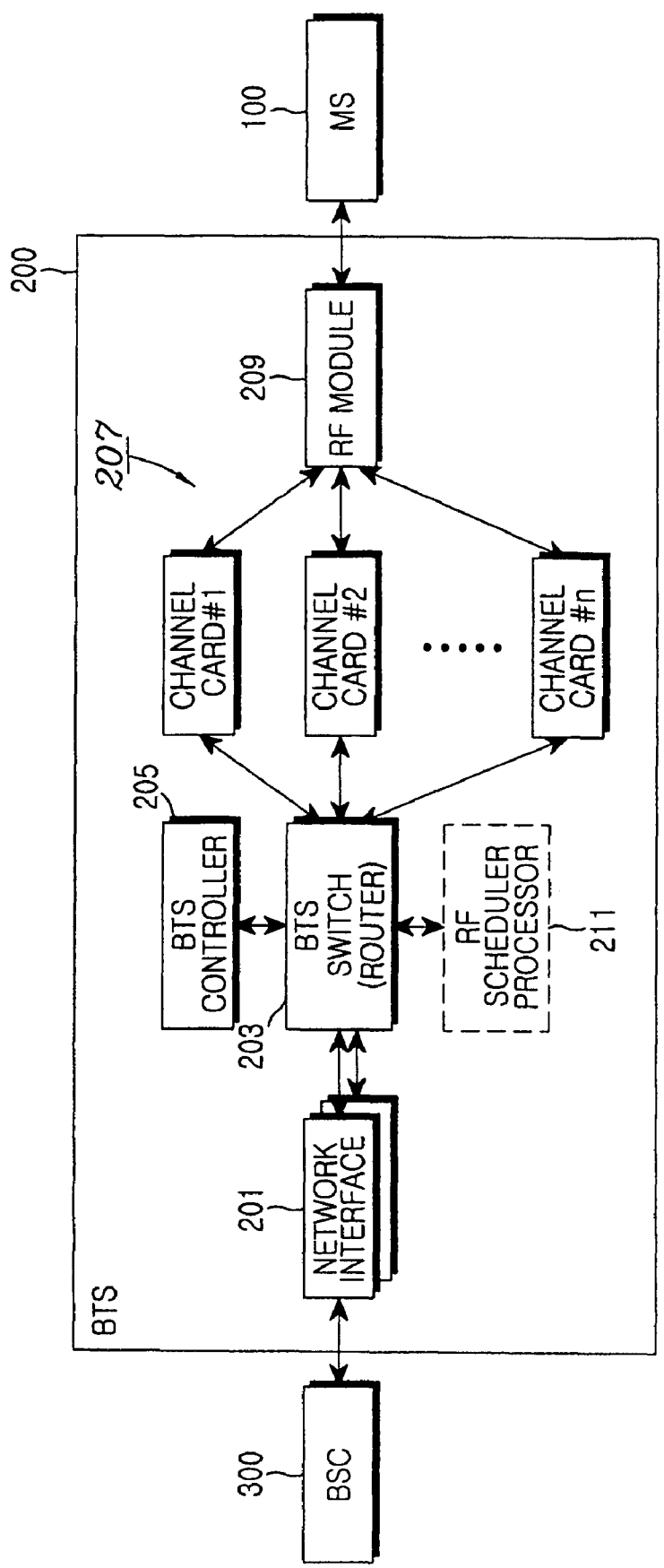
FIG. 2 is a block diagram of a typical BTS.
Figure 3:
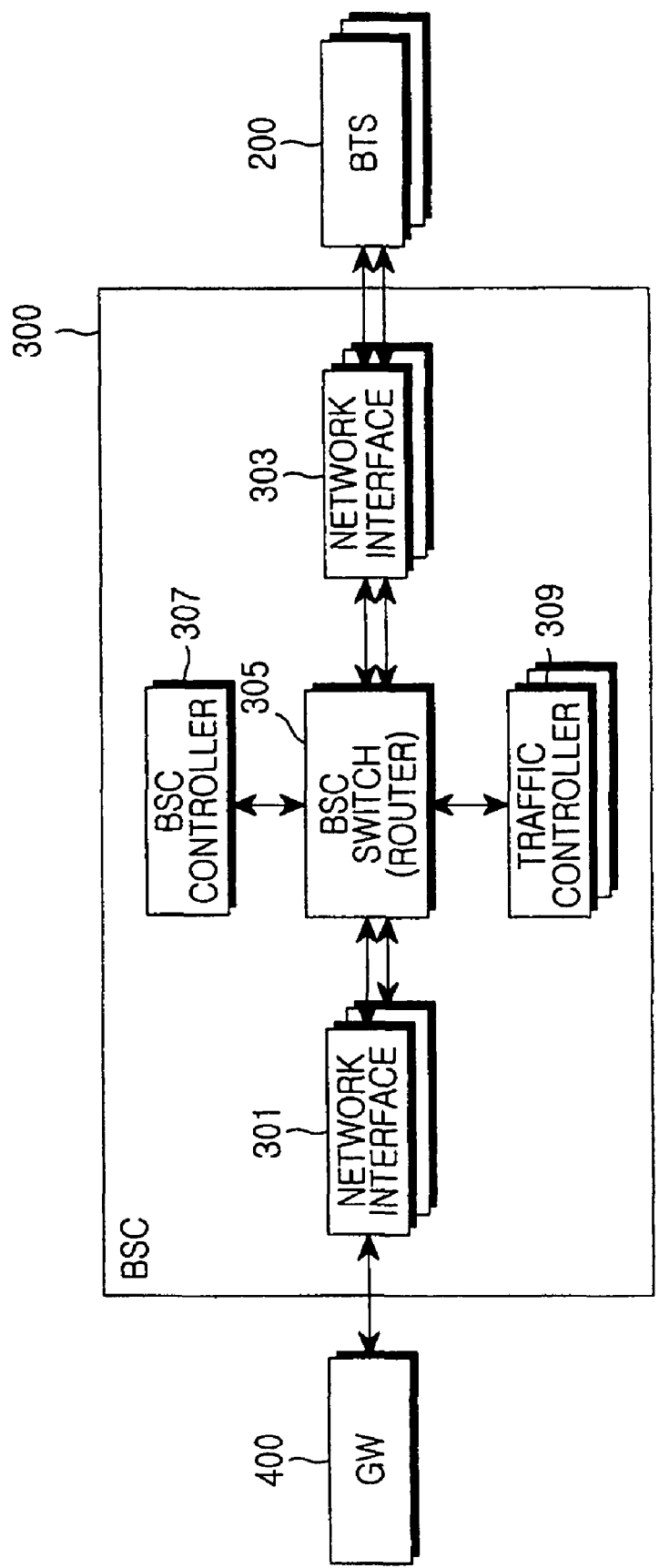
FIG. 3 is a block diagram of a typical BSC.
Figure 4:
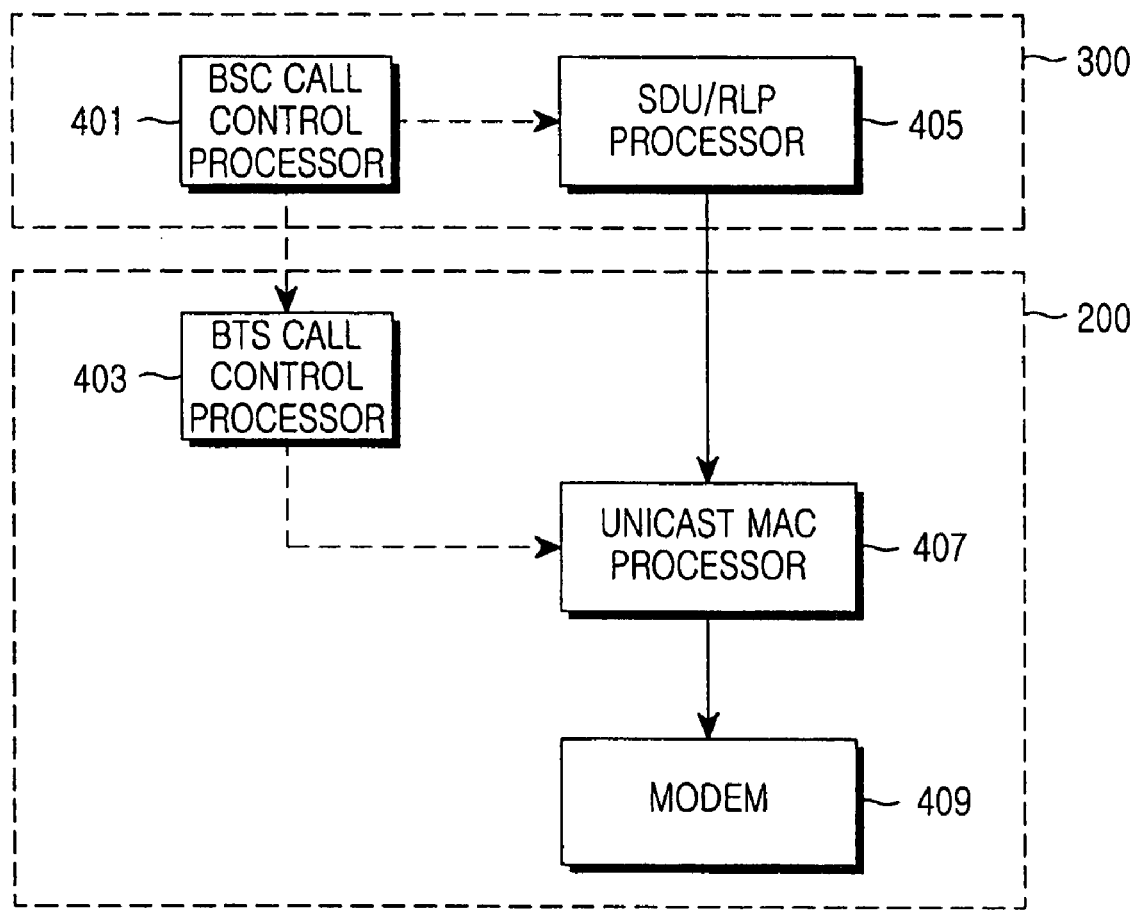
FIG. 4 is a block diagram of an AN for supporting conventional unicast transmission.
Figure 5:
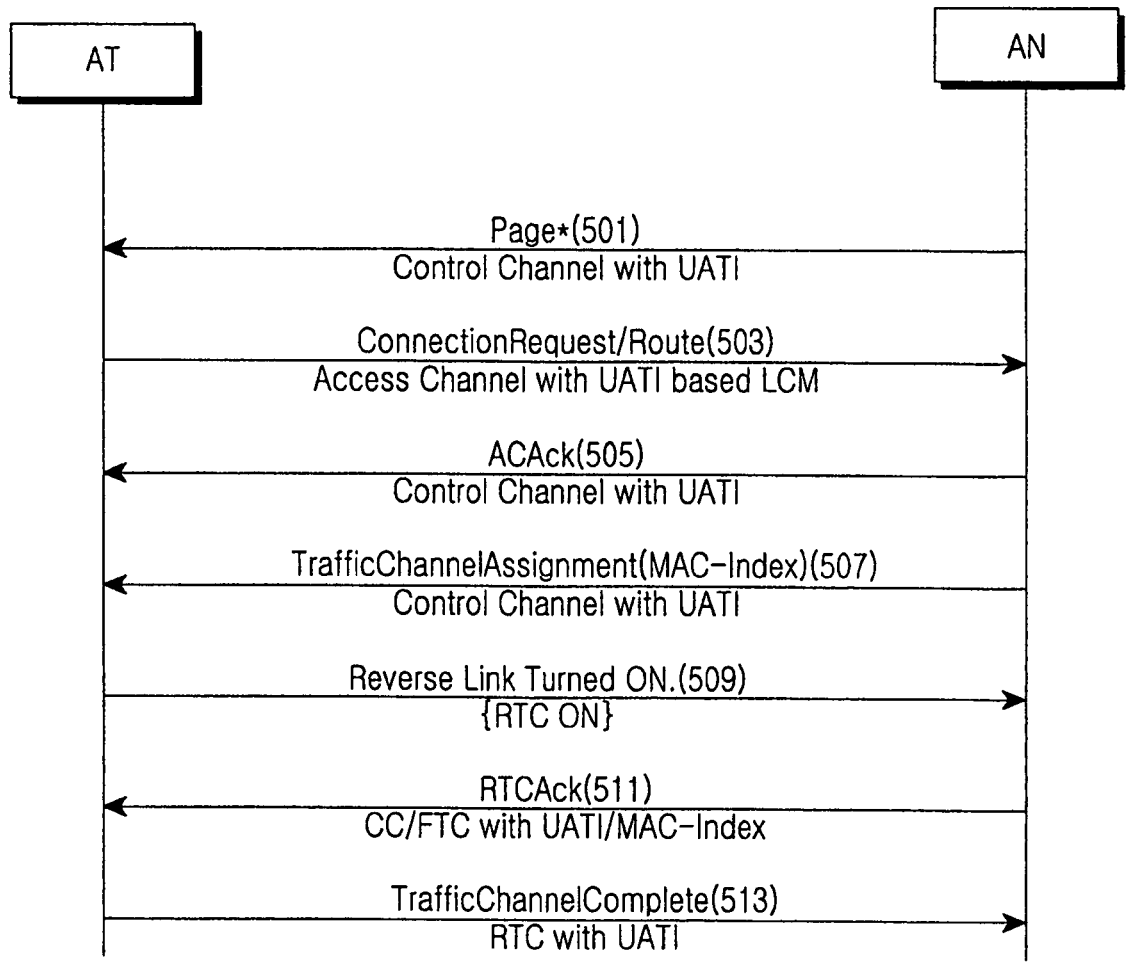
FIG. 5 is a diagram illustrating a signal flow for conventional traffic channel assignment.
Figure 7:
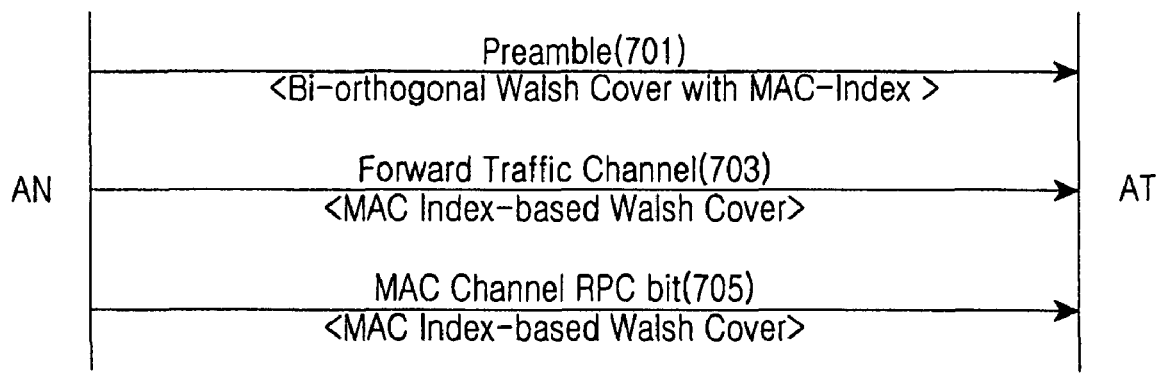
FIG. 7 depicts conventional unicast forward transmission.
Figure 8:
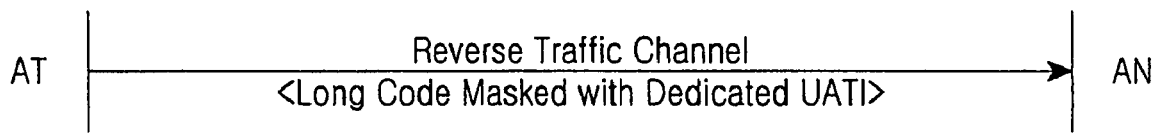
FIG. 8 depicts conventional reverse link transmission.
Figure 13:
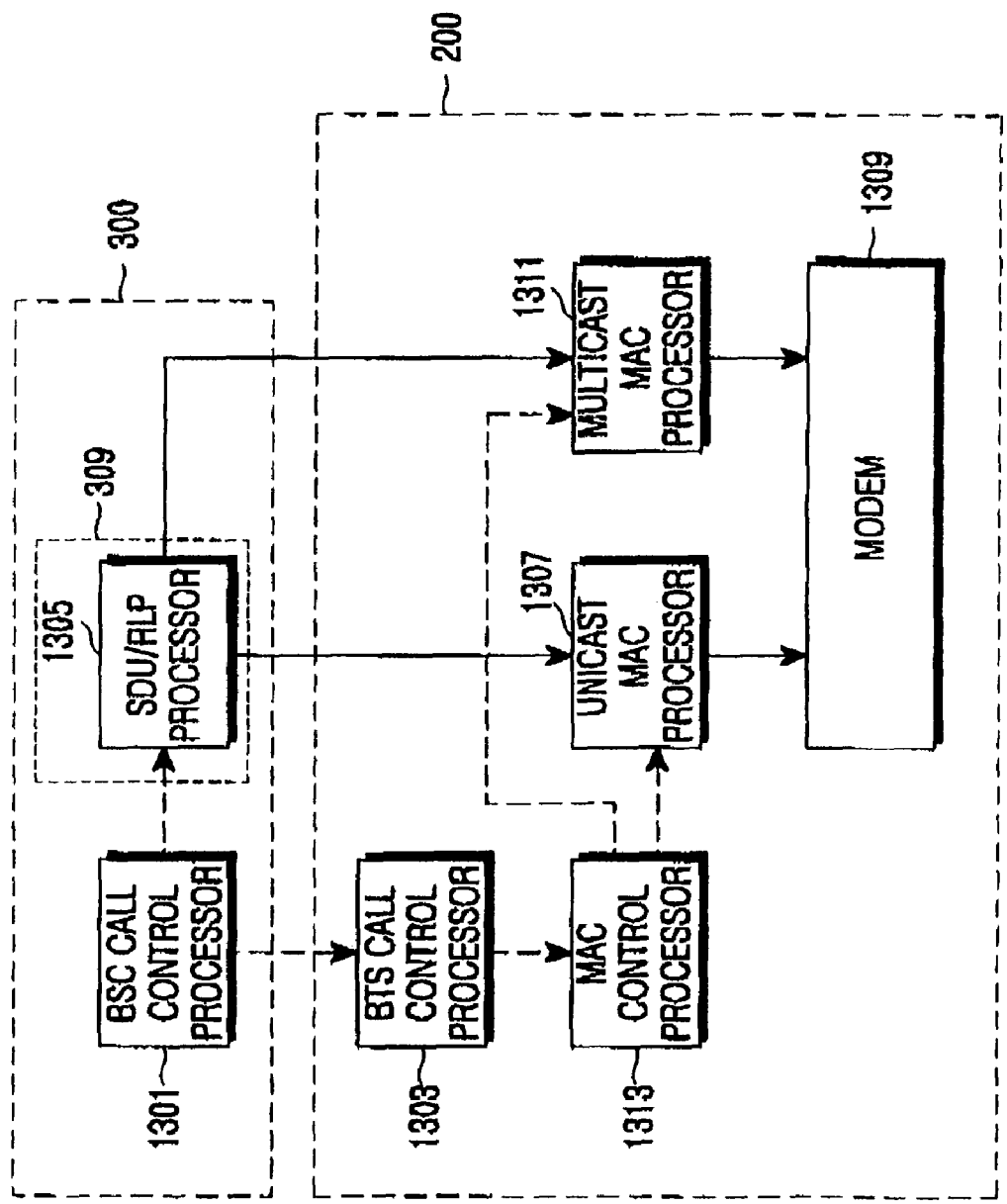
FIG. 13 is a block diagram of an AN for multicast transmission according to the embodiment of the present invention.

FIG. 13 is a block diagram of an AN for multicast transmission according to an embodiment of the present invention. The network configuration of a mobile communication system according to an embodiment of the present invention is basically identical to that illustrated in FIGS. 1, 2 and 3, except that the AN is further comprised of the multicast MAC processor 1311 and a MAC control processor 1313 in addition to those conventional unicasting elements illustrated in FIG. 4. Similarly, a solid line indicates a traffic path, while a dotted line indicates a control information path.

Referring to FIG. 13, the AN covers the BSC 300 and the BTS 200. The BTS 300 is comprised of a call control processor 1301 and an SDU/RLP processor 1305. The BTS 200 includes a call control processor 1303, a unicast MAC processor 1307, a MODEM 1309, the multicast MAC processor 1311, and the MAC control processor 1313.

The MAC control processor 1313 manages multicast MAC (MMAC) indexes for groups, and dedicated MAC (DMAC) indexes and UATIs for ATs, categorizes a plurality of ATs serviced by the AN into a plurality of multicast groups, and assigns an MMAC to each multicast group. The MAC control processor 1313 also assigns a DMAC index to each AT and controls both MAC processors 1307 and 1311 in a call process depending on transmission modes which will be described later. An MMAC index is assigned to a multicast group, which is distinguished from a MAC index assigned to an AT in a unicast transmission mode.

The unicast MAC processor 1307 and the multicast MAC processor 1311 manage DMAC indexes, MMAC indexes, and UATIs and transmit traffic received from the SDU/RLP processor 1305 to the MODEM 1309 along with a DMAC index/MMAC index and a UATI assigned to a corresponding AT.

The MODEM 1309 encodes the traffic received from the unicast MAC processor 1307 and the multicast MAC processor 1311, spreads the code symbols with Walsh codes corresponding to the DMAC index or the MMAC index, and modulates the spread signal prior to transmission on a radio channel to the AT.

Thus, the AN supports multicast transmission as well as the conventional unicast and broadcast transmission. It also supports unicast and multicast transmissions, or unicast and broadcast transmissions at the same time. This type of transmission is defined as simultaneous cast transmission. Any simultaneous transmission of two transmission schemes is called simultaneous cast transmission, unless specified otherwise. Multicast transmission is further branched into interactive multicast transmission involving reverse link transmission and non-interactive multicast transmission, which is forward link transmission only.

Figure 12:
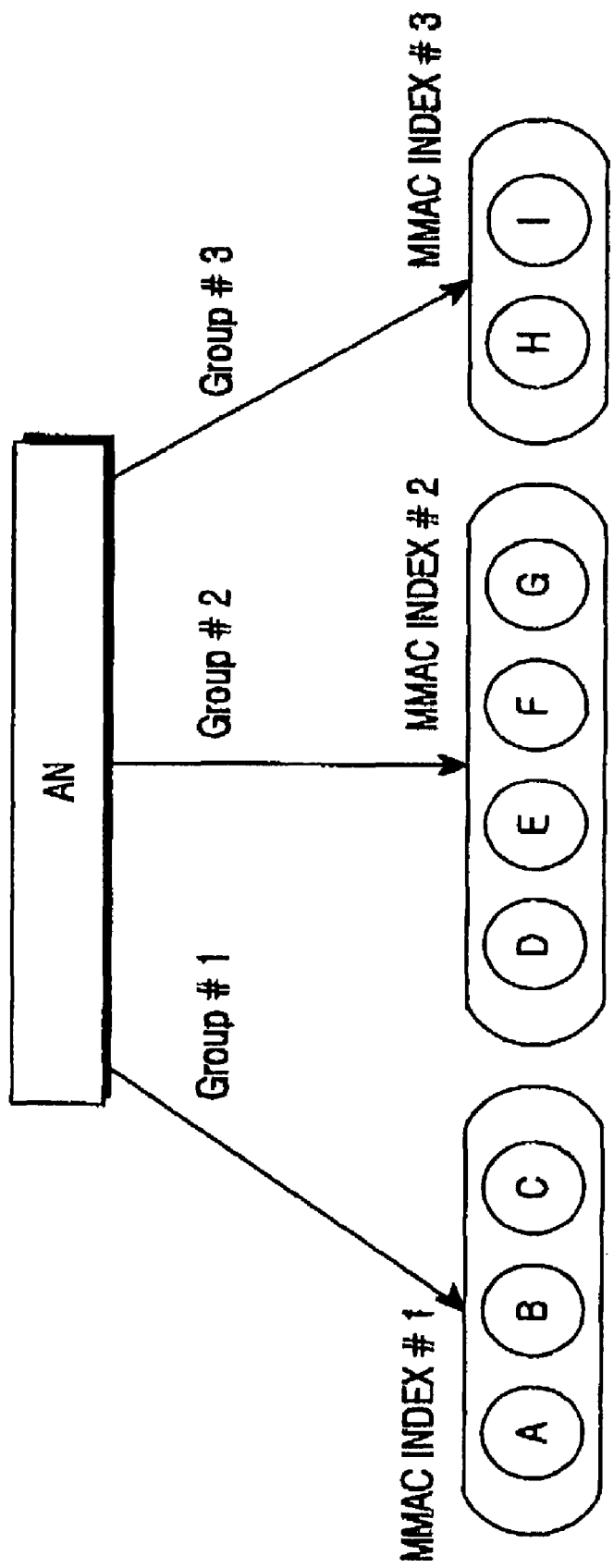
FIG. 12 illustrates grouping MSs for multicast transmission according to an embodiment of the present invention.

Multicast transmission will now be described in detail with reference to FIGS. 12 to 35. FIG. 12 depicts grouping ATs for multicast transmission according to the embodiment of the present invention.

Referring to FIG. 12, the AN assigns a different MMAC index to each multicast group. For simplicity of description, ATs A, B and C are grouped as multicast group #1, ATs D to G are grouped as multicast group #2, and ATs H and I are grouped as multicast group #3. MMAC index #1 is assigned to multicast group #1, MMAC index #2 is assigned to multicast group #2, and MMAC index #3 is assigned to multicast group #3.

Thus, the AN transmits the same data to the ATs of a particular multicast group using Walsh codes corresponding to the MMAC index of the group.

Figure 14:
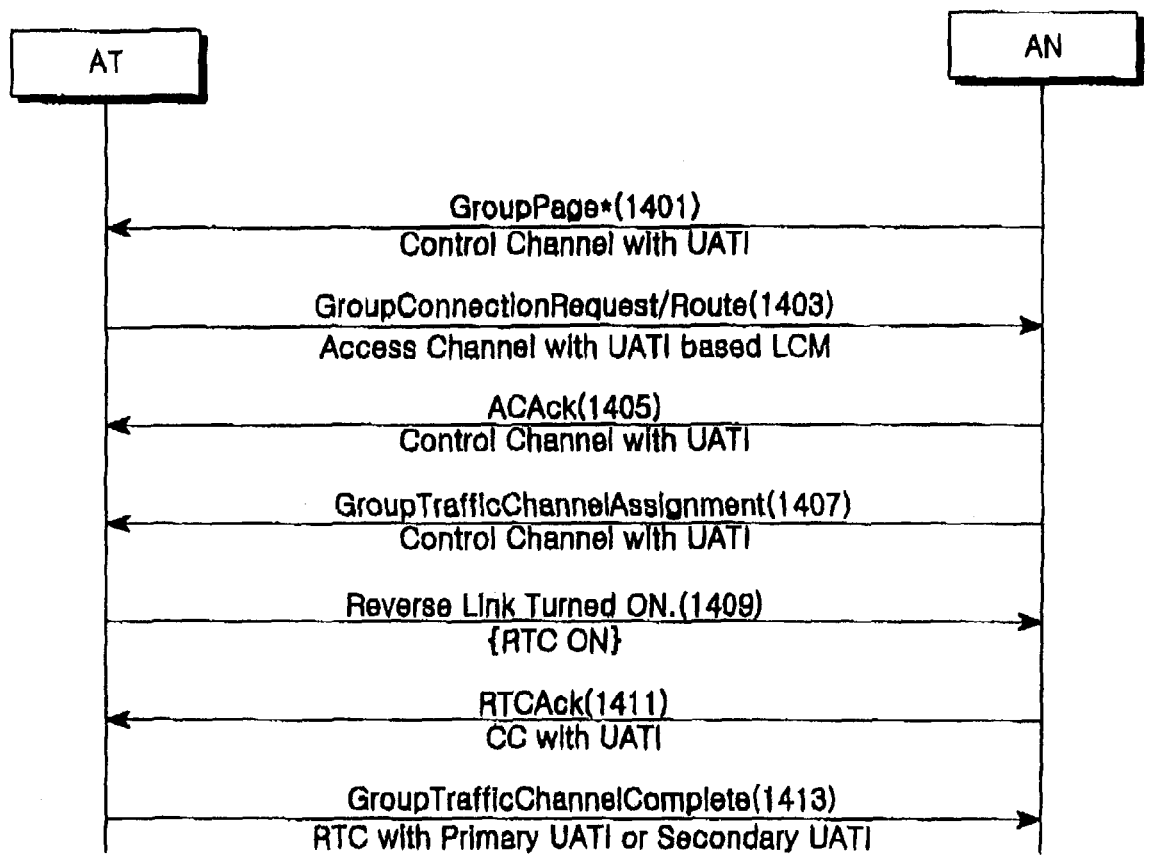
FIG. 14 is a diagram illustrating a signal flow for traffic channel assignment according to the embodiment of the present invention.

FIG. 14 is a diagram illustrating a signal flow for establishing a multicast call and assigning an MMAC index between an AN and an AT according to the embodiment of the present invention.

A multicast call setup is requested when the AN transmits a GroupPage message to the AT (i.e., call termination), or the AT transmits a RouteUpdate message to the AN to update its location information in some particular situation. This situation can be multicast call origination from the AT, periodic location update, or movement of the AT.

Referring to FIG. 14, to multicast data to the AT, the AN transmits the GroupPage message to the AT on a CC in step 1401. The AT reads a page message with its UATI set as a recipient among messages delivered on the CC. Here, the GroupPage message tells the AT to request traffic channel assignment when multicast traffic arrives. The GroupPage message is unnecessary in the case of call origination from the AT or routing update, which is well known to those skilled in the art.

The AT, upon receipt of the page message or for call origination, transmits to the AN a GroupConnectionRequest message on an AC which is long-code-masked according to its UATI, requesting traffic channel assignment in step 1403. Alternatively, the AT can transmit a RouteUpdate message to the AN in this step. The GroupConnectionRequest message or RouteUpdate message specifies a transmission mode for the multicast call. As shown in FIG. 28, a GroupCallType field in the GroupConnectionRequest message indicates the multicast transmission mode as interactive multicast, non-interactive multicast or simultaneous cast.

In step 1405, the AN transmits an ACAck message to the AT on the CC, notifying normal reception of the GroupConnectionRequest/RouteUpdate message. The AN then assigns a group traffic channel to the AT by a GroupTrafficChannelAssignment message with the UATI of the AT set as a recipient on the CC in step 1407. The traffic channel assignment is equivalent to transmission of an MMAC index (i.e.

assignment of Walsh codes). Thus, when receiving data on the group traffic channel spread with the Walsh codes corresponding to the MMAC index, the AT can read the data destined for its multicast group since it already knows the Walsh codes. According to the multicast transmission mode, only the MMAC index or both MMAC index and DMAC index are assigned to the AT. When necessary, a secondary UATI can be assigned to the AT in addition to the UATI (primary UATI) according to the transmission modes.

In step 1409, the AT transmits null data on a RTC which is long-code-masked according to its UATI. In step 1411 the AN responds by transmitting an RTCAck message with the UATI set as a recipient to the AT on the CC, reporting normal reception of the RTC. In step 1413 the AT transmits a GroupTrafficChannelComplete message to the AN on the RTC, which is long-code-masked according to its primary or secondary UATI, notifying the AN of successful completion of group traffic channel assignment.

Figure 15:
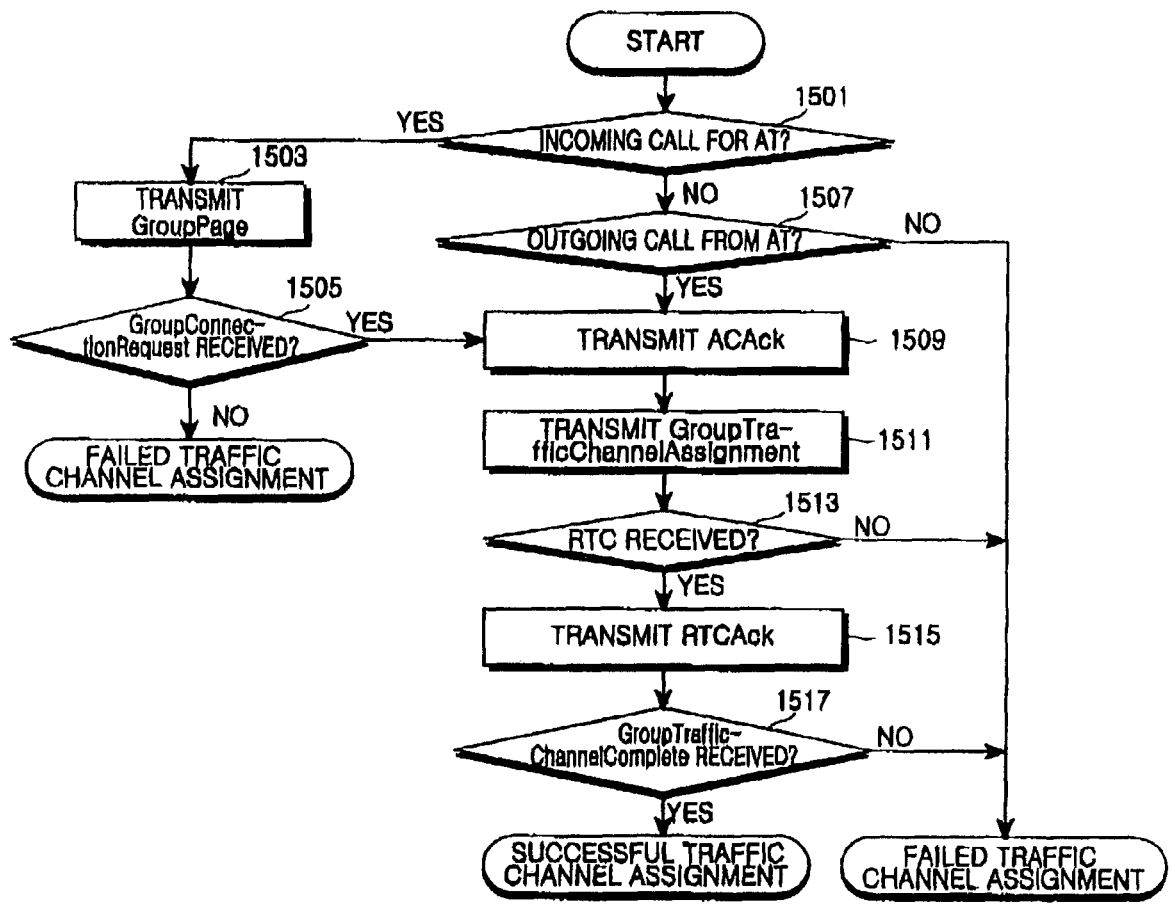
FIG. 15 is a flowchart illustrating a traffic channel assigning procedure in the AN according to the embodiment of the present invention.

FIG. 15 is a flowchart illustrating a multicast call setup procedure in the AN. Referring to FIG. 15, the procedure begins with decision step 1501 in which the AN decides whether to multicast data to the AT. More particularly, the AN decides whether a multicast call to be established is an incoming call for the AT in decision step 1501. In the case of an incoming call for the AT ("Yes" path from decision step 1501), the AN transmits the GroupPage message to the AT in step 1503. Upon receipt of the GroupConnectionRequest message from the AT in step 1505 ("Yes" path from decision step 1505), the AN proceeds to step 1509 to continue the traffic channel assigning procedure. On the contrary, if the AN determines that it did not receive the GroupConnectionRequest message from the AT in decision step 1505 ("No" path), this means a failed traffic channel assignment.

However, if the multicast call is not an incoming call for the AT in step 1501 ("No" path from decision step 1501), the AN decides whether the multicast call is originated from the AT in decision step 1507. More particularly, the AN decides whether the GroupConnectionRequest message has been received in decision step 1507. In the case of call origination from the AT ("Yes" path from decision step 1507), (i.e., upon receipt of the GroupConnectionRequest message), the AN transmits the ACAck message to the AT in step 1509, notifying normal reception of the GroupConnectionRequest message, and transmits the GroupTrafficChannelAssignment message to the AT in step 1511.

Upon receipt of null data on the RTC from the AT, the AN transmits the ACAck message to the AT ("Yes" path from decision step 1513), notifying normal reception of the RTC in step 1515. If the AN receives the GroupTrafficChannelComplete message from the AT ("Yes" path from decision step 1517), it considers that the traffic channel assignment is successful. On the contrary, if the AN fails to receive the GroupTrafficChannelComplete message in decision step 1517 ("No" path), it considers that the traffic channel assignment has failed.

Figure 16:
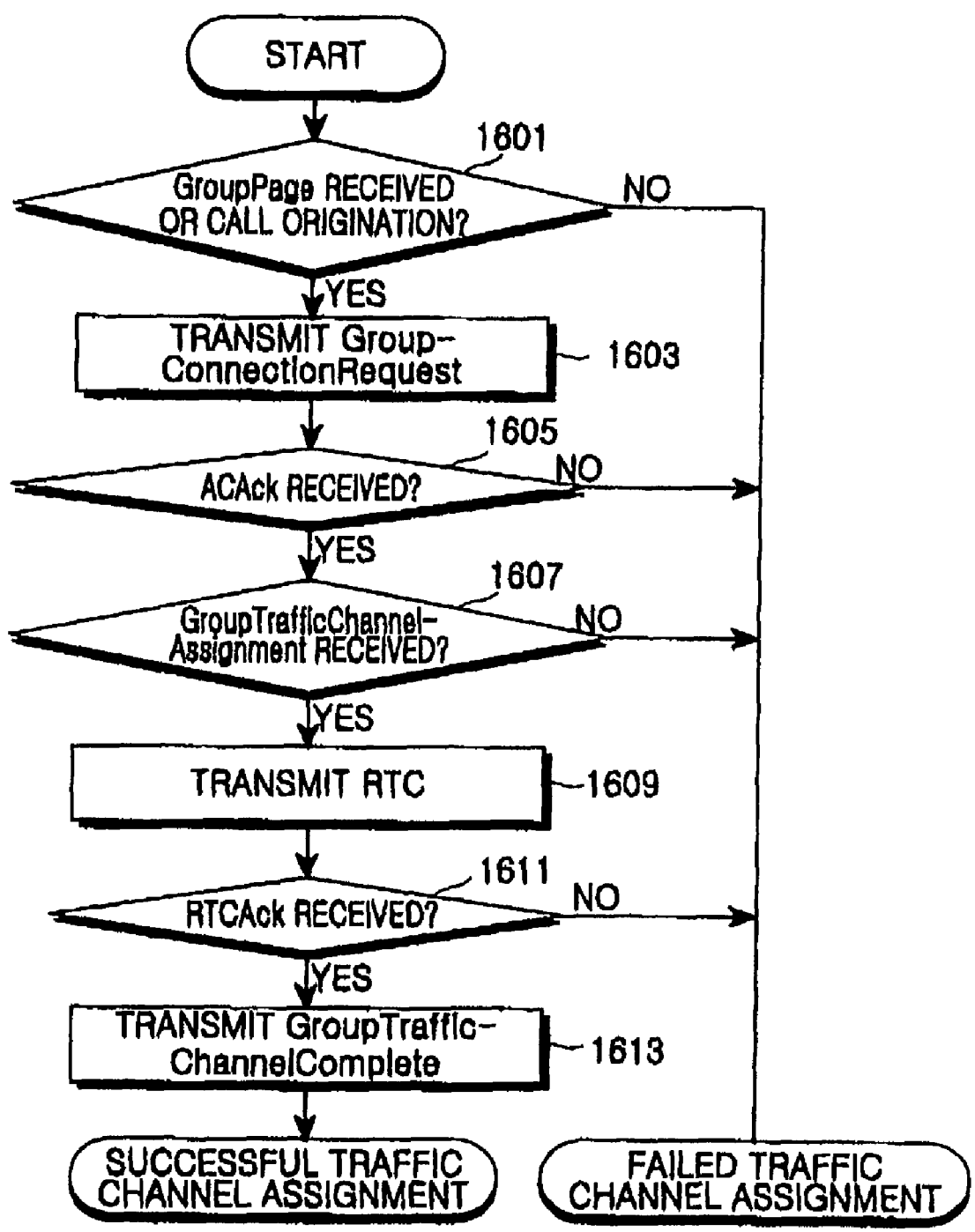
FIG. 16 is a flowchart illustrating a traffic channel assigning procedure in an AT according to the embodiment of the present invention.

FIG. 16 is a flowchart illustrating a multicast call procedure in the AT according to the embodiment of the present invention. Referring to FIG. 16, when the AT originates a call or receives the GroupPage message from the AN ("Yes" path from decision step 1601), it transmits the GroupConnectionRequest message to the AN, for call setup, in step 1603.

Upon receipt of the ACAck and GroupTrafficChannelAssignment messages from the AN ("Yes" path from decision steps 1605 and then 1607), the AT transmits the RTC to the AN in step 1609. Upon receipt of a response for the RTC ("Yes" path from decision step 1611), the AT transmits the GroupTrafficChannelComplete message to the AN, notifying successful traffic channel assignment, in step 1603. If the AT fails to receive the ACAck message ("No" path from decision step 1605), the GroupTrafficChannelAssignment message ("No" path from decision step 1607), or the RTCAck message ("no" path from decision step 1611), it considers that the traffic channel assignment has failed.

FIG. 17 is a table listing radio channel information that the AN manages for the AT to support multicast transmission through MMAC index assignment according to the embodiment of the present invention. As illustrated in FIG. 17, a preamble, a forward traffic packet, and RTC bits are transmitted on forward channels.

As stated before, the GroupTrafficChannelAssignment message supports five transmission modes depending on system implementation, as compared to the conventional technology supporting only unicast and multicast data transmission. Each of the five transmission modes will now be briefly described.

(1) Unicast transmission: When engaging in Unicast transmission, the AN spreads the preamble, forward traffic packet, and RPC bits with Walsh codes corresponding to a DMAC index, prior to transmission to a particular AT.

(2) Interactive multicast transmission: When engaging in Interactive multicast transmission, the AN assigns an MMAC index for forward traffic transmission and a DMAC index for RTC power control to the AT in order to allow the ATs of the same multicast group to control RTC power separately.

(3) Non-interactive multicast transmission: When engaging in Non-interactive multicast transmission, the AN assigns the MMAC index to the AT, for forward traffic transmission. Since reverse transmission is not defined, RPC bits are not considered.

(4) Simultaneous cast transmission: When engaging in Simultaneous cast transmission to simultaneously support both unicast and multicast transmission, or both unicast and broadcast transmission, the AN assigns the AT the DMAC index for unicast transmission, and the MMAC index for multicast transmission or BMAC index for broadcast transmission. The AN also assigns a DMAC index to each AT, for RPC.

(5) Broadcast transmission: When engaging in Broadcast transmission, radio channels are defined as conventionally done.

FIGS. 18 to 21 illustrate forward transmission of the preamble channel, FTC, and the RPC channel as a subchannel of a MAC channel.

Figure 18:
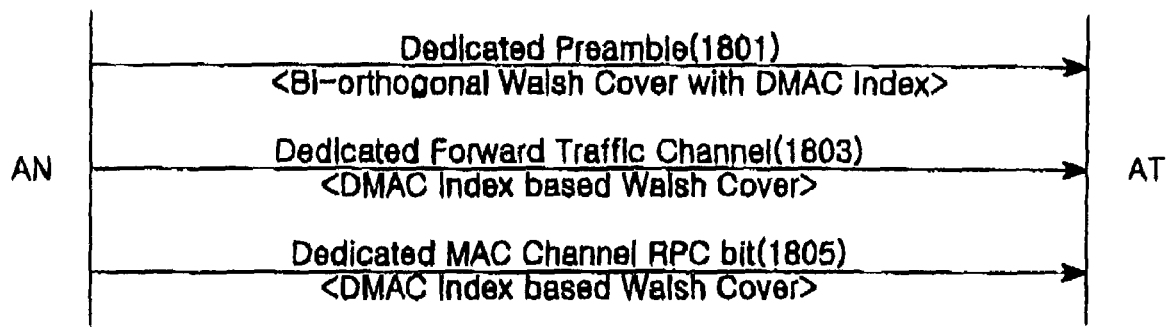
FIG. 18 illustrates forward unicast transmission according to the embodiment of the present invention.

FIG. 18 illustrates unicast transmission of the preamble, traffic channel packet, and RPC bits according to the embodiment of the present invention. Referring to FIG. 18, a preamble 1801, an FTC packet 1803, and RPC bits 1805 are all covered with Walsh codes corresponding to the DMAC index of the AT.

Figure 19:
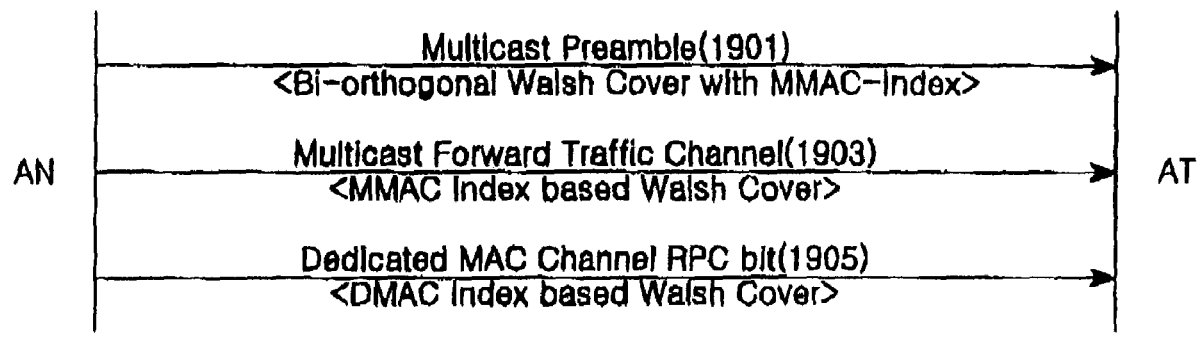
FIG. 19 illustrates forward interactive multicast transmission according to the embodiment of the present invention.

FIG. 19 illustrates interactive multicast transmission of the preamble, traffic channel packet, and RPC bits according to the embodiment of the present invention. Referring to FIG. 19, a preamble 1901 and an FTC packet 1903 are covered with Walsh codes corresponding to the MMAC index of a multicast group which the AT belongs to, while RPC bits 1905 are covered with a Walsh code corresponding to the DMAC index of the AT.

Figure 20:
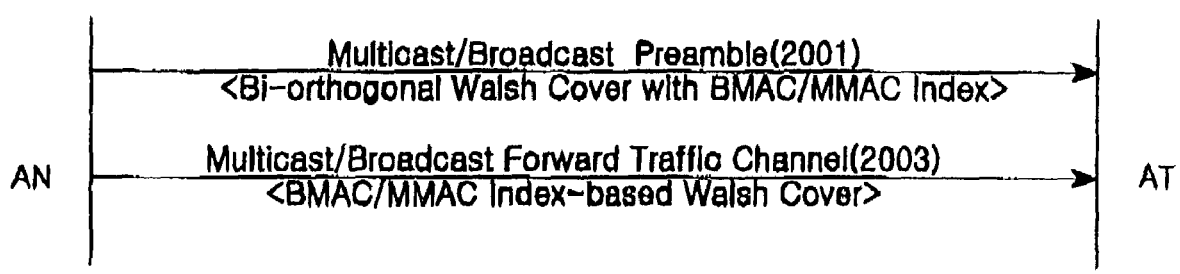
FIG. 20 illustrates forward non-interactive multicast/broadcast transmission according to the embodiment of the present invention.

FIG. 20 illustrates non-interactive multicast transmission or broadcast transmission of the preamble, traffic channel packet, and RPC bits according to the embodiment of the present invention. Referring to FIG. 20, the MMAC index of the AT is applied to a preamble 2001 and an FTC packet 2003 for non-interactive multicast transmission, while a BMAC index is applied to them for broadcast transmission.

Figure 21:
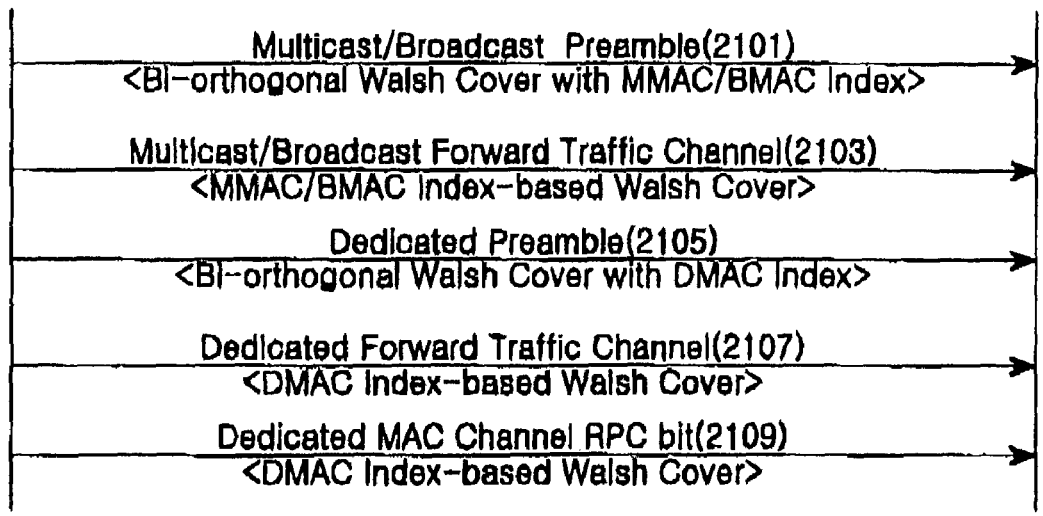
FIG. 21 illustrates forward simultaneous cast transmission according to the embodiment of the present invention.

FIG. 21 illustrates simultaneous cast transmission of the preamble, traffic channel packet, and RPC bits according to the embodiment of the present invention. Referring to FIG. 21, a preamble 2101 and an FTC packet 2103 are covered with Walsh codes corresponding to the MMAC index or BMAC index, for multicast or broadcast transmission. Alternatively, for unicast transmission, a preamble 2105 and an FTC packet 2107 are spread with Walsh codes corresponding to the DMAC index. In any of the cases, the DMAC index is applied to RPC bits.

Figure 9:
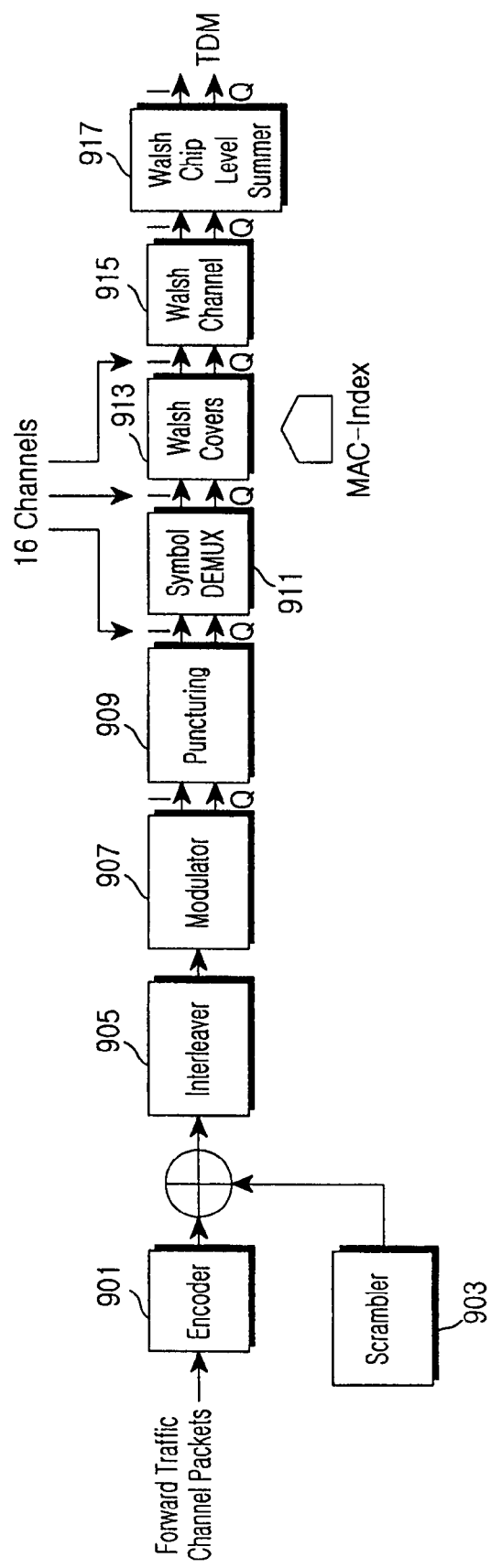
FIG. 9 is a block diagram of a conventional FTC unicasting transmitter.
Figure 10:
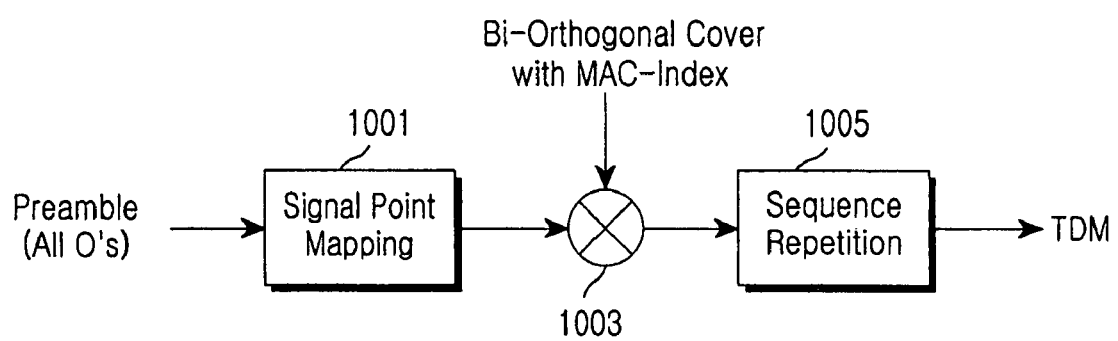
FIG. 10 is a block diagram of a conventional preamble channel unicasting transmitter.
Figure 11:
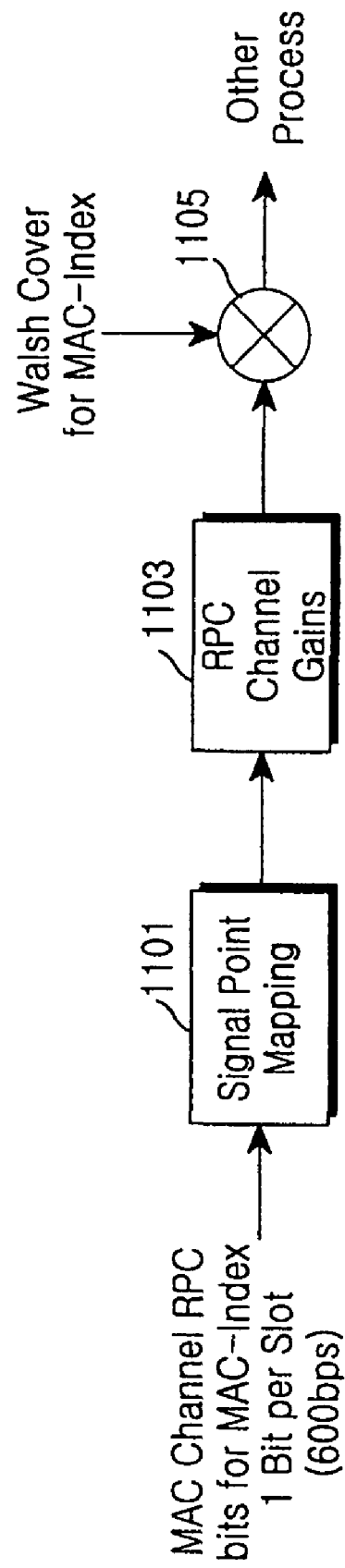
FIG. 11 is a block diagram of a conventional RPC bits unicasting transmitter.
Figure 22:
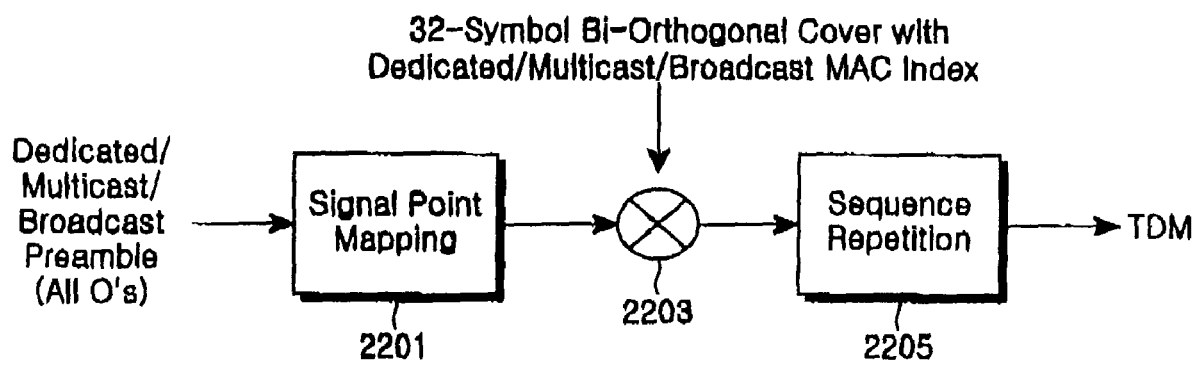
FIG. 22 is a block diagram of a forward preamble multicasting transmitter according to the embodiment of the present invention.
Figure 23:
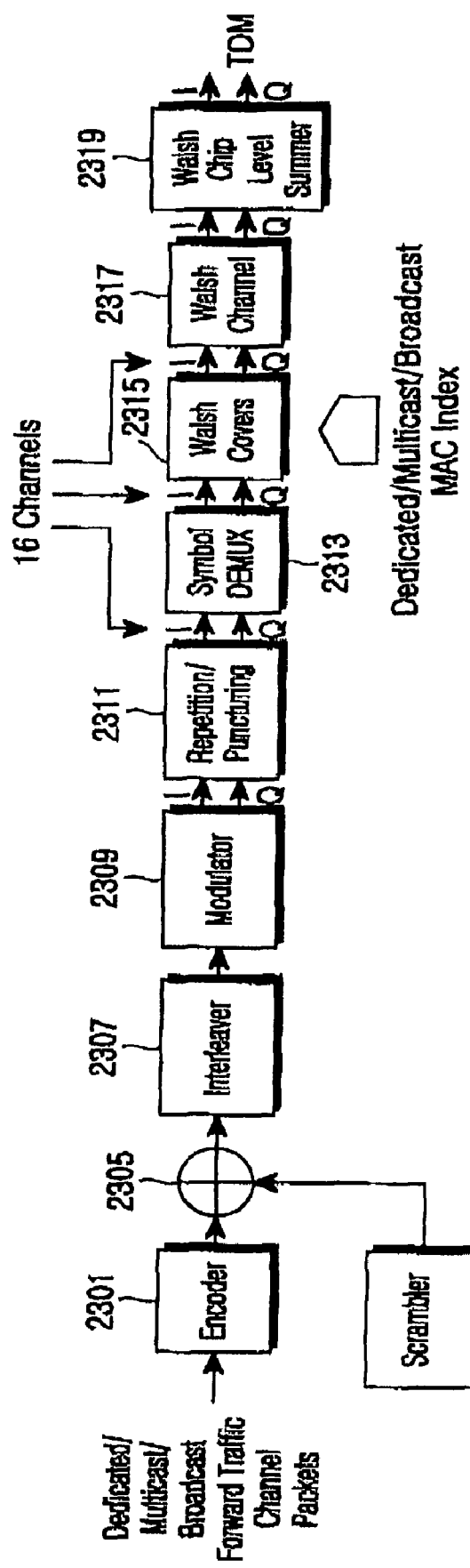
FIG. 23 is a block diagram of an FTC multicasting transmitter according to the embodiment of the present invention.
Figure 24:
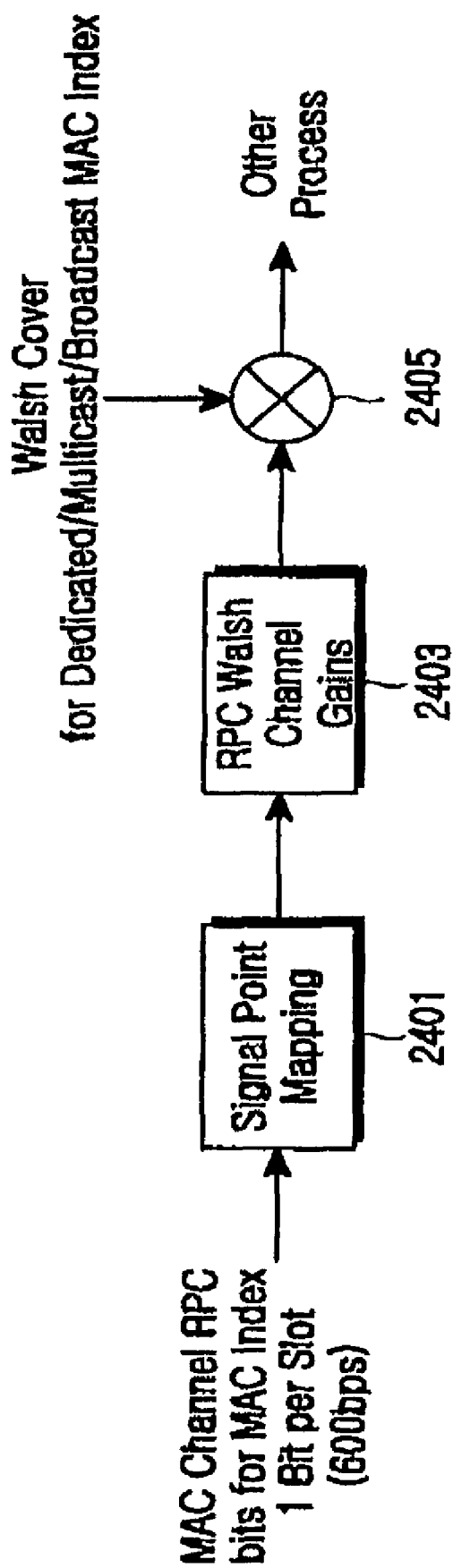
FIG. 24 is a block diagram of an RPC bit multicasting transmitter according to the embodiment of the present invention.

FIGS. 22, 23 and 24 are block diagrams of function blocks for processing the preamble, forward packet data, and RPC bits prior to transmission. The function blocks operate in the same manner as those illustrated in FIGS. 9, 10 and 11. Thus, a detailed description of the function blocks will not be repeated here. However, it is to be noted that only a DMAC index is used in the conventional technology supporting the unicast transmission alone, whereas DMAC, MMAC, and BMAC indexes are adopted for Walsh covering according to transmission modes in accordance with various embodiments the present invention.

For simultaneous cast transmission, the AN needs to decide whether reverse traffic is for a unicast service or for a multicast service.

FIG. 17 depicts two ways of identifying a reverse traffic channel transmission scheme according to the embodiment of the present invention. One is to use a secondary UATI in addition to a primary UATI which is assigned when a session is established. The primary UATI is used for reverse traffic transmission for a unicast service, and the secondary UATI, for reverse traffic transmission for a multicast service. That is, the primary UATI indicates a first reverse traffic address. And, the secondary UATI or the primary UATI with classifier indicate a second reverse traffic address. The secondary UATI can be set in the GroupTrafficChannelAssignment message or delivered in a separate procedure.

The other way is to use the primary UATI commonly for both unicast and multicast transmissions and additionally define a Classifier field for distinguishing between unicast transmission and multicast transmission in a reverse traffic channel message. For compatibility with simultaneous cast transmission, interactive multicast transmission and non-interactive multicast transmission require the same field structure. Thus, the Classifier field is also assigned for interactive multicast transmission and non-interactive multicast transmission.

A procedure for assigning the secondary UATI will now be described. As described above, the secondary UATI can be assigned in two ways. In the case where the secondary UATI is assigned by the GroupTrafficChannelAssignment message, a novel field for delivering the secondary UATI must be inserted in the message. Alternatively, the secondary UATI can be assigned to each AT in a procedure illustrated in FIG. 25.

Figure 25:
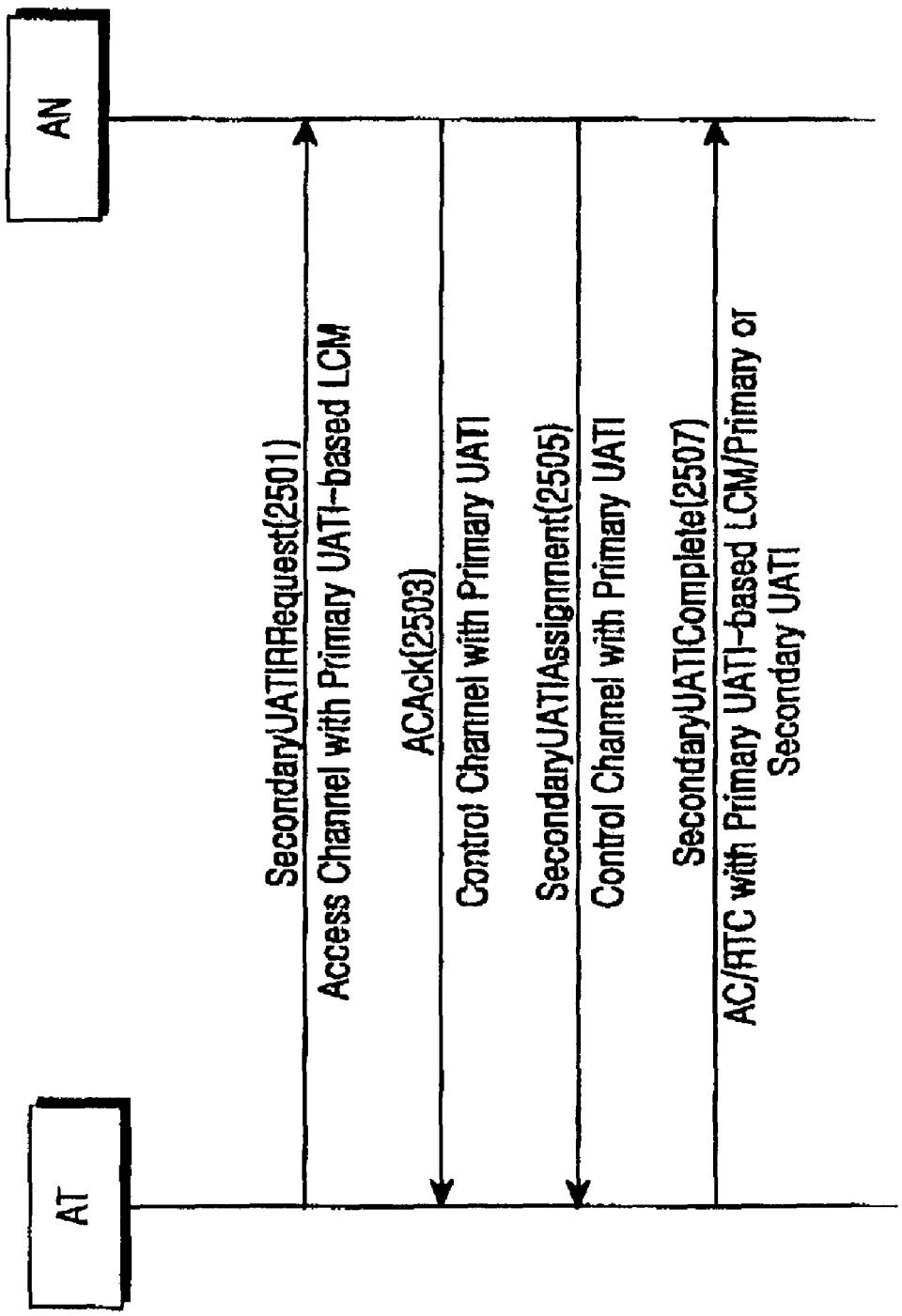
FIG. 25 illustrates a secondary UATI assigning procedure according to the embodiment of the present invention.

Referring to FIG. 25, in step 2501 the AT transmits a SecondaryUATIRequest message to the AN on an AC which is long-code-masked according to the primary UATI of the AT, requesting assignment of a secondary UATI. In step 2503 the AN transmits an ACAck message with the primary UATI as a recipient to the AT on a CC, notifying normal reception of the SecondaryUATIRequest message, and assigns the secondary UATI to the AT by a SecondaryUATIAssignment message in step 2505. In step 2507, the AT then transmits a SecondaryUATIComplete message to the AN, notifying successful assignment of the secondary UATI. The SecondaryUATIComplete message is transmitted on the AC which is long-code-masked according to the primary UATI or on an RTC which is long-code-masked according to the primary or secondary UATI.

The discussions made above so far relate to grouping a plurality of ATs and defining physical channels by signaling procedures. The structures and functions of signaling messages involved in the signaling procedures are illustrated in FIGS. 26 to 35.

FIGS. 26 and 27 specify structures of the GroupPage message by which the AN pages the AT for multicast transmission. When a plurality of ATs are grouped for multicast transmission, each AT can belong to one multicast group only, or a plurality of multicast groups. In the former case, the AN transmits the GroupPage message illustrated in FIG. 26. Here, MessageID identifies the GroupPage message.

In the latter case, the GroupPage message defined in FIG. 27 is transmitted to the AT. GroupID identifies one of multicast groups that the AT belongs to, for which multicast traffic has been generated.

FIG. 28 specifies the structure of the GroupConnectionRequest message. The value of TransactionID is increased by one each time the AT transmits the GroupConnectionRequest message to detect repeated transmission of the message or errors. RequestReason is a field that tells the reason for requesting a call connection. For example, if RequestReason is 0x0, this indicates an outgoing call from the AT, and if it is 0x1, this indicates an incoming call for the AT. As stated before, the GroupConnectionRequest message specifies a multicast transmission mode. To do so, a GroupCallType message is used. For example, if GroupCallType is 0x0, the transmission mode is an interactive multicast mode, if it is 0x1, the transmission mode is a non-interactive multicast mode, and if it is 0x2, the transmission mode is a simultaneous cast mode. Matching the total bit number of the message on a byte basis is reserved in order to facilitate processing.

FIGS. 29 and 30 define the structures of the GroupChannelAssignment message according to the transmission modes.

Referring to FIG. 29, for non-interactive multicast transmission, MessageSequence is set to a value one higher than MessageSequence of the last GroupTrafficChannelAssignment message for the AT. ChannelIncluded is a 1-bit field that indicates whether a pilot channel-related information records are included. If ChannelIncluded is 1, pilot channel information is included, and if it is 0, the pilot channel information is not included. The pilot channel information includes system type, band class, and channel number. Channel provides the pilot channel information when ChannelIncluded is 1. FrameOffset defines a frame offset to be used for RTC transmission.

DRCLength indicates the length of a DRC (Data Rate Control) value that is delivered on a DRC channel. The DRC channel is used for the AT to request a desired data rate to the AN. DRCChannelGain provides a relative DRC channel power to the power of a reverse traffic pilot channel. ACKChannelGain is a field that provides a relative Ack channel power to the power of the reverse traffic pilot channel. The Ack channel is used to indicate whether the AT has normally received a physical layer packet from the AN. NumMulticastPilots indicates the number of pilot-related information records included in the message.

PilotPN is the pilot PN offset of the serving AN. SofterHandoff is set to 1 if an FTC related to the pilot channel uses a closed-loop power control bit identical to the previous pilot, and otherwise, it is set to 0. MACIndex indicates a MAC index assigned to the AT. DRCCover is a field that sets the index of a DRC cover related to the AN. RABLength indicates the transmission interval of an RAB (Reverse Activity Bit). The RAB indicates the activity of a reverse channel. It is delivered on an RA (Reverse Activity) channel of a MAC channel. RABOffset is an indicator indicating a slot in which a novel RAB is delivered from the AN.

As illustrated in FIG. 29, an MMAC index is set in MACIndex in the GroupTrafficChannelAssignment message.

FIG. 30 illustrates the structure of the GroupTrafficChannelAssignment message in a simultaneous cast transmission mode supporting both interactive multicast transmission and unicast transmission, especially when the secondary UATI is assigned in a separately defined procedure. Referring to FIG. 30, this GroupTrafficChannelAssignment message is almost identical to that for non-interactive multicast transmission. They are different in that a DMAC index for reverse power control as well as an MMAC index for FTC transmission is assigned in the interactive multicast transmission mode, while the DMAC index is additionally assigned for unicast transmission and thus a corresponding field is added in the simultaneous cast mode. Therefore, instead of NumPilots, NumUnicastPilots and NumMulticastPilots are newly defined and both the DMAC and MMAC indexes are set in MACIndex.

FIG. 31 defines the GroupTrafficChannelAssignment message containing secondary UATI assignment information in a simultaneous cast mode. To assign a secondary UATI, SecondaryUATIIncluded is newly defined, which is the difference between this GroupTrafficChannelAssignment message and the GroupTrafficChannelAssignment message illustrated in FIG. 29. SecondaryUATIIncluded indicates the presence or absence of the secondary UATI assignment information. If SecondaryUATIIncluded is 1, it indicates the presence of the secondary UATI, and if SecondaryUATIIncluded is 0, it indicates the absence of the secondary UATI. SubnetIncluded indicates the presence or absence of information required to compute a subnet. SecondaryUATISubnetMask is a mask used for the subnet computation and SecondaryUATI104 indicates the upper 104 bits of the secondary UATI. SecondaryUATIColorCode is an 8-bit color code. SecondaryUATI024 indicates the lower 24 bits of the secondary UATI. UpperOldSecondaryUATILength indicates the lower 4 bits of OldUATI[127:24] and is delivered in the SecondaryUATIComplete message.

Thus, in the GroupTrafficChannelAssignment message, the DMAC index and MMAC index are set in MACIndex and the secondary UATI is set in SecondaryUATI104 and SecondaryUATI024.

FIG. 32 defines the GroupTrafficChannelComplete message and FIG. 33 illustrates the structure of the SecondaryUATIRequest message. Each MessageID identifies a corresponding message.

The SecondaryUATIAssignment and SecondaryUATIComplete messages required to assign the secondary UATI in an independent procedure are illustrated in FIGS. 34 and 35. The AN transmits secondary UATI information to the AT in SecondaryUATI104 and SecondaryUATI024 of the SecondaryUATIAssignment message. The fields of these messages function in the same manner as those of the other described messages. Therefore, their description will not be repeated here.

In accordance with the embodiment of the present invention, a plurality of ATs are grouped into different multicast groups and different MMAC indexes are assigned to the multicast groups, for multicast transmission as illustrated in FIG. 12. The multicast transmission can also be carried out in a different method. This method will be described below as another embodiment of the present invention with reference to FIGS. 36 to 47.

Figure 36:
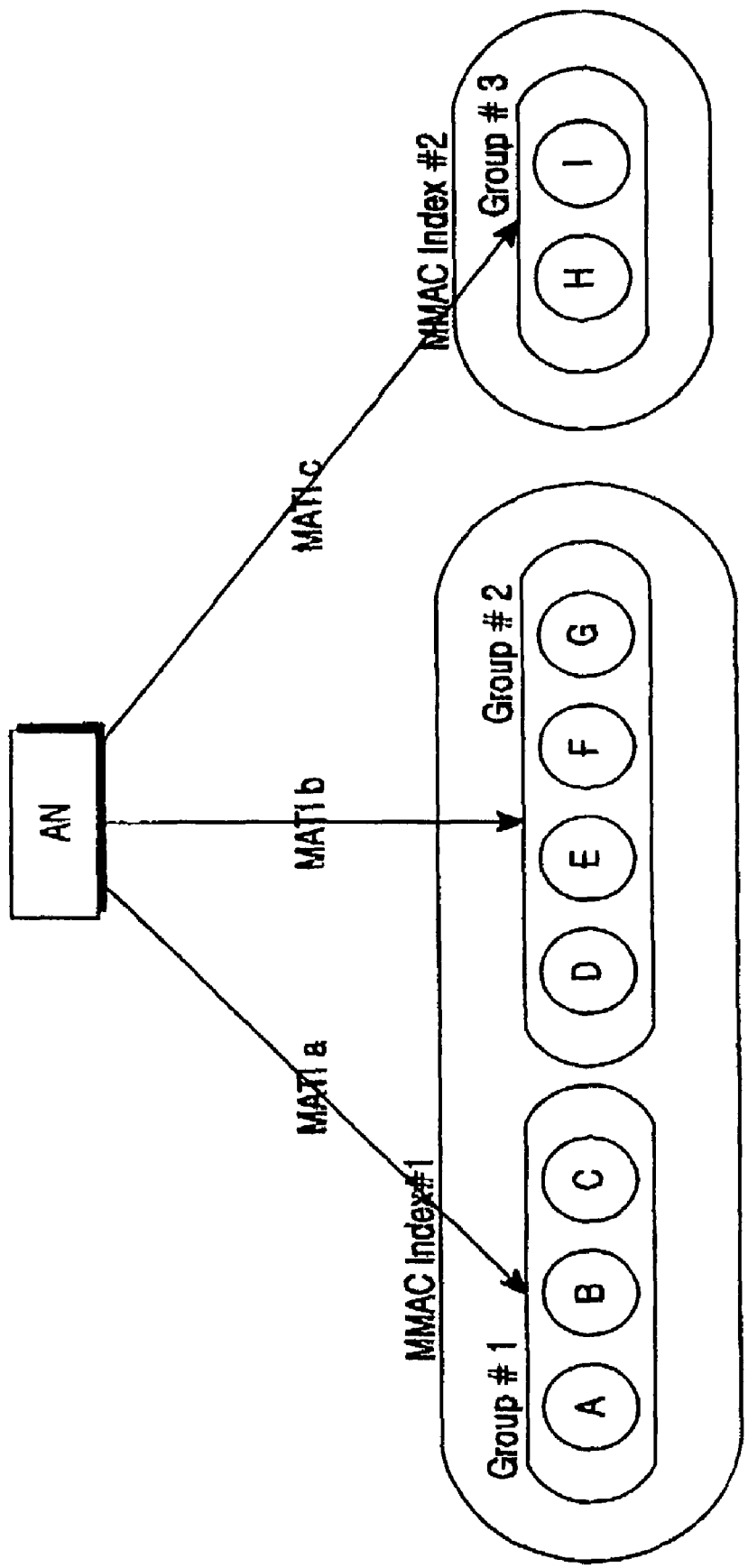
FIG. 36 illustrates grouping ATs for multicast transmission according to another embodiment of the present invention.

FIG. 36 illustrates a grouping of ATs for multicast transmission according to another embodiment of the present invention. The AN groups the ATs into multicast groups and assigns MAC indexes to the multicast group. Each multicast group has a different MMAC index or at least two multicast groups share the same MMAC index.

Referring to FIG. 36 (which is similar to the grouping illustrated in FIG. 12), ATs A, B and C are grouped as multicast group #1, ATs D to G are grouped as multicast group #2, and ATs H and I are grouped as multicast group #3. MMAC index #1 is assigned to multicast groups #1 and #2 and MMAC index #2 is assigned to multicast group #3. The AN also assigns a different temporary address (i.e., an MATI) to each multicast group, to distinguish message recipients by groups. For example, MATI a, MATI b, and MATI c are assigned to group #1, #2 and #3, respectively.

Therefore, the ATs of groups #1 and #2 share an FTC but extract only messages with recipients set as their groups on the FTC. The ATs of group #3 receive messages on an FTC assigned to group #3.

Figure 37:
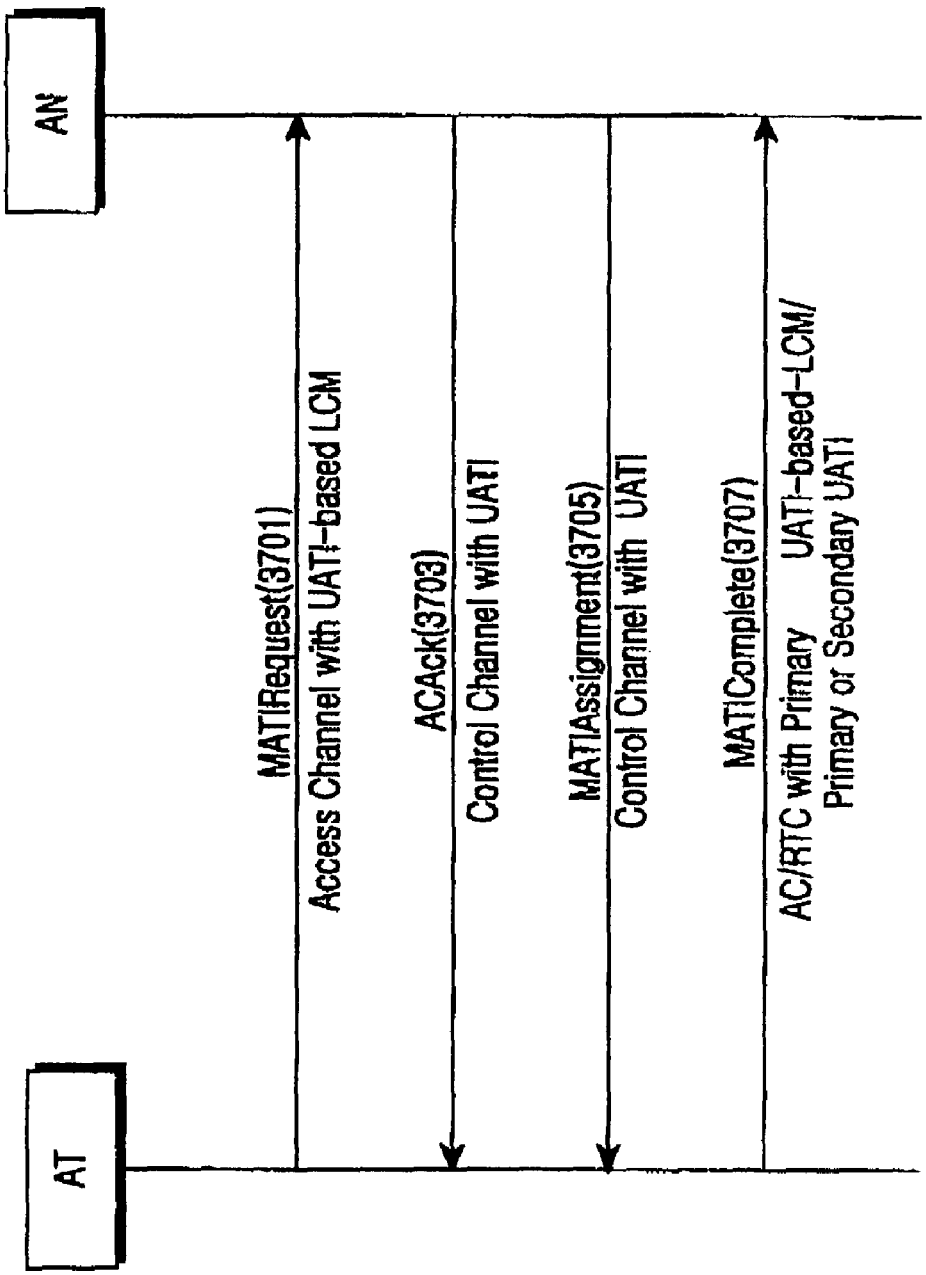
FIG. 37 is a diagram illustrating a signal flow for MATI (Multicast Access Terminal Identifier) assignment according to the second embodiment of the present invention.

The multicast transmission according to the second embodiment of the present invention is carried out by a signaling procedure similar to the MMAC index assigning procedure illustrated in FIG. 14 in the AN configured as illustrated in FIG. 13. FIG. 37 is a diagram illustrating a signal flow for MATI assignment according to the second embodiment of the present invention. It is to be noted that an MATI can be assigned by the GroupTrafficChannelAssignment message. In this case, the GroupTrafficChannelAssignment message further includes MATIIncluded and MATI fields.

Referring to FIG. 37, in step 3701, the AT transmits to the AN an MATIRequest message on an AC which is long-code-masked according to its UATI assigned when a session is established, requesting MATI assignment.

In step 3703, the AN transmits an ACAck message to the AT on a CC with the UATI as a recipient, notifying normal reception of the MATIRequest message. The AN then assigns an MATI to the AT by an MATI Assignment message in step 3705. As described before, the MATIAssignment message may contain the secondary UATI of the AT according to a transmission mode. In a simultaneous cast mode supporting unicast transmission and multicast/broadcast transmission, the secondary UATI indicates whether reverse traffic is for a unicast service or for a multicast service. The secondary UATI can be assigned in the separate procedure illustrated in FIG. 25.

In step 3707, the AT transmits an MATIComplete message to the AN on the AC long-code-masked according to its primary UATI or on an RTC long-code-masked according to the primary or secondary UATI, notifying successful completion of MATI assignment.

The structures and functions of the messages used in the MATI assigning procedure are defined in FIGS. 38 to 41. FIG. 38 defines the MATIRequest message, FIG. 39 defines the MATIAssignment message in the case where the secondary UATI is assigned in a separate procedure, FIG. 40 defines the MATIAssignment message containing the secondary UATI, and FIG. 41 defines the MATIComplete message. Descriptions of the fields of the above messages will not be repeated here in detail, because it is obvious to one skilled in the art that the fields function in the same manner as their counterparts of the messages used for the already-described secondary UATI assigning procedure.

FIG. 42 illustrates the structure of a GroupTrafficChannelAssignment message by which an MATI is assigned. FIGS. 43A and 43B illustrate the fields of a GroupTrafficChannelAssignment message containing MATI and secondary UATI assignment information.

FIG. 44 illustrates radio channel information that the AN manages for the AT in order to support multicast transmission using the assigned MMAC index and MATI. In an interactive multicast mode, the AN assigns the MMAC index and the MATI to the AT, for transmission of a preamble and forward traffic. The AN also assigns a DMAC index to the AT, for RTC power control. When only a non-interactive multicast mode is supported, the AN assigns the MMAC index and the MATI to the AT, for transmission of a preamble and forward traffic, without assigning the DMAC index for transmission of RPC bits.

In a simultaneous cast mode, the AN assigns the AT the DMAC index for unicast transmission of the preamble and the forward traffic, and the MMAC/BMAC index and the MATI for multicast/broadcast transmission. The AN also assigns the DMAC index to the AT for RTC power control. Radio channels for unicast/broadcast transmission or RTC transmission are defined similarly to those in the first embodiment of the present invention.

Figure 45:
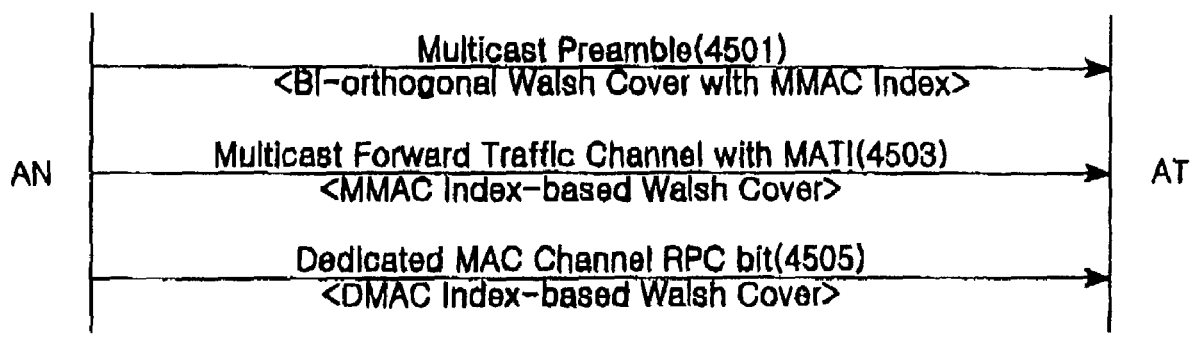
FIG. 45 illustrates forward interactive multicast transmission according to the second embodiment of the present invention.
Figure 46:
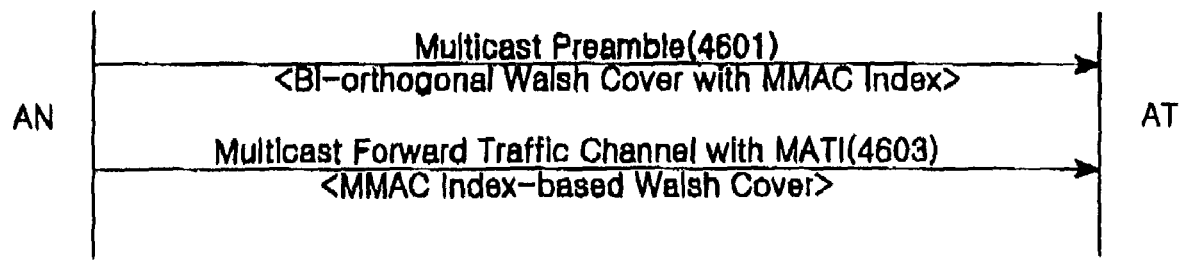
FIG. 46 illustrates forward non-interactive multicast transmission according to the second embodiment of the present invention.
Figure 47:
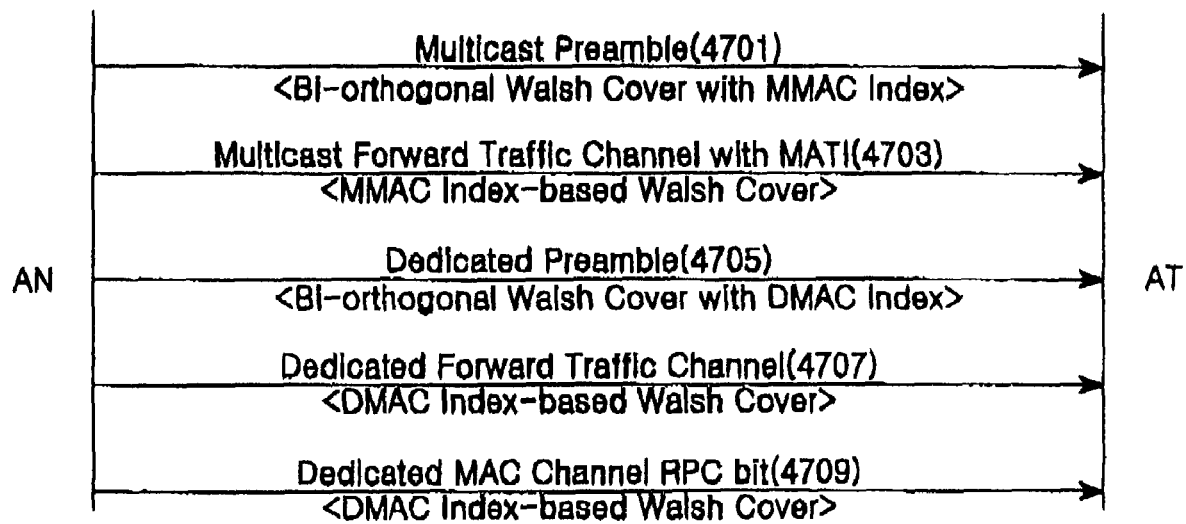
FIG. 47 illustrates forward simultaneous cast transmission according to the second embodiment of the present invention.

FIGS. 45, 46 and 47 illustrate forward transmissions of the preamble channel, the FTC, and the RPC bits on the RPC channel in interactive multicast, non-interactive multicast, and simultaneous cast transmission modes, respectively.

Referring to FIG. 45, for interactive multicast transmission, a preamble 4501 is covered with a Walsh code corresponding to an MMAC index assigned to the group of the AT. Both MMAC index and MATI are applied to an FTC packet 4503. A DMAC index assigned to the AT is used for RPC bits 4505, similarly to the unicast transmission mode.

Referring to FIG. 46, for non-interactive multicast transmission, the MMAC index is applied to a preamble 4601 and both MMAC index and MATI are used for an FTC packet 4603. While not shown, the preamble is transmitted using a BMAC index and the FTC packet, using both BMAC index and BATI in a broadcast mode.

Referring to FIG. 47, in a simultaneous cast mode supporting unicast and multicast transmissions, if a preamble 4701 and an FTC packet 4703 are multicast, the preamble 4703 is covered with a Walsh code corresponding to the MMAC index. The FTC packet 4703 is covered with Walsh codes corresponding to the MMAC index and transmitted with the MATI set as a recipient to the AT. On the other hand, if a preamble 4705 and an FTC packet 4707 are unicast, the DMAC index is applied to them. In both cases, RPC bits 4709 are transmitted using the DMAC index. While not shown, in a simultaneous cast mode supporting unicast and broadcast transmissions, the BMAC index and BATI substitute for the MMAC index and MATI.

In accordance with the second embodiment of the present invention, a plurality of ATs are grouped such that a different MMAC index is assigned to each multicast group or one MMAC index is shared among a plurality of multicast groups. In the latter case, MATIs are assigned to multicast groups to distinguish the multicast groups. It can be further contemplated as a third embodiment that multicast transmission is carried out by assigning a different MATI to each multicast group without using MMAC indexes. This will be described below with reference to FIGS. 48 to 52.

Figure 48:
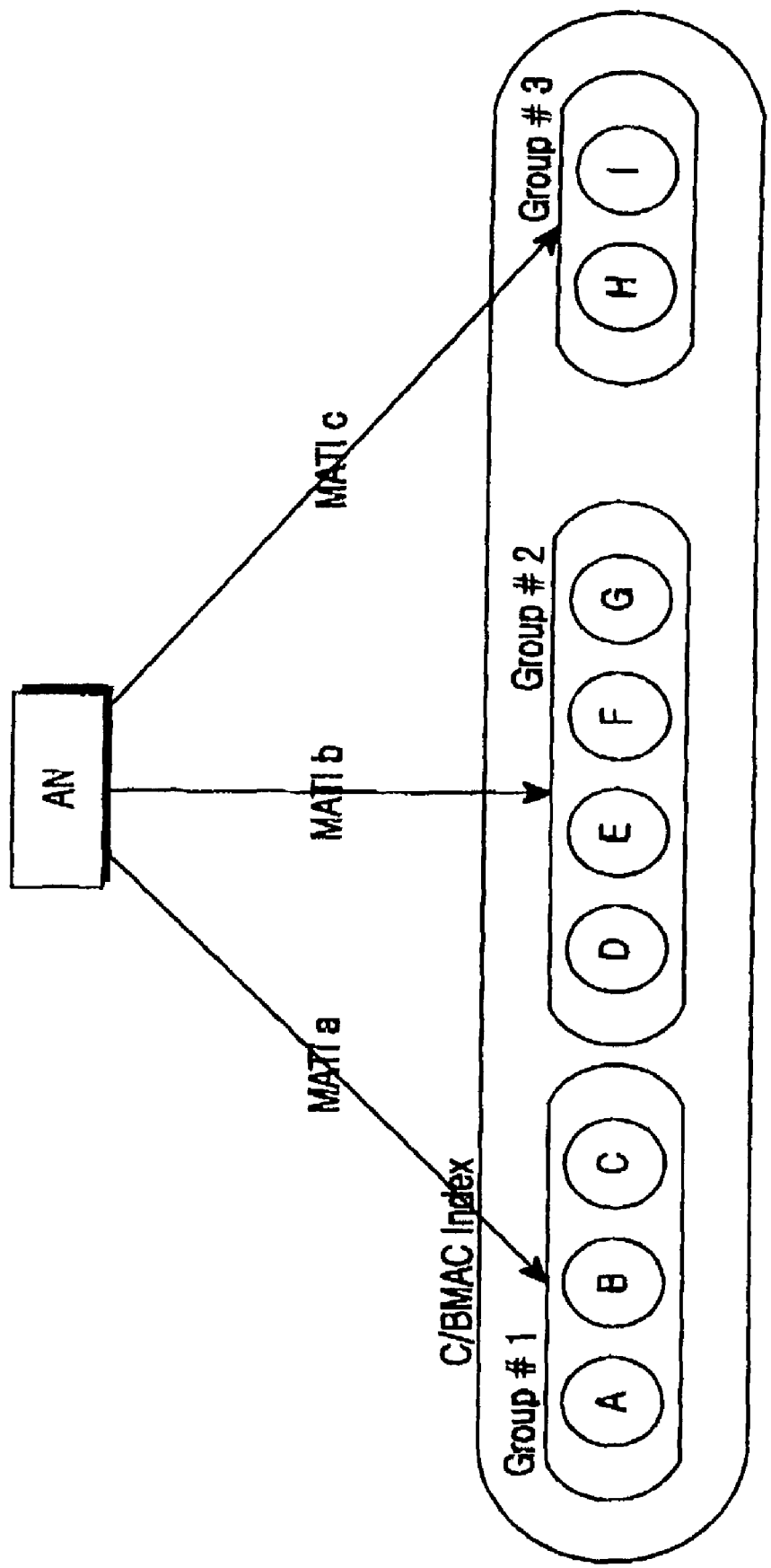
FIG. 48 illustrates grouping ATs for multicast transmission according to a third embodiment of the present invention.

FIG. 48 illustrates grouping ATs for multicast transmission according to the third embodiment of the present invention. Referring to FIG. 48, ATs A, B and C are grouped as multicast group #1, ATs D to G are grouped as multicast group #2, and ATs H and I are grouped as multicast group #3. MATI a, MATI b, and MATI c are assigned to group #1, #2 and #3, respectively. All forward traffic messages to be multicast are delivered with a BMAC index or CMAC (Common MAC) index. The CMAC index indicates a common channel dedicated to multicast transmission. While the above multicast groups receive data using the CMAC index, they are distinguished by their different MATIs. Hereinafter, the CMAC index is also called the BMAC index.

Therefore, each AT extracts only a message with a recipient set as the MATI of its group among messages received on the common channel.

The multicast transmission according to the third embodiment of the present invention is carried out by a signaling procedure similar to the MATI assigning procedure illustrated in FIG. 37 in the AN configured as illustrated in FIG. 13.

FIG. 49 illustrates radio channel information that the AN manages for the AT in order to support multicast transmission through MATI assignment. In an interactive multicast mode, the AN assigns a BMAC index and an MATI to the AT, for transmission of a preamble and forward traffic. The AN also assigns a DMAC index to the AT, for RTC power control. When only a non-interactive multicast mode is supported, the AN assigns the BMAC index and the MATI to the AT, for transmission of a preamble and forward traffic. Because reverse transmission is not supported, there is no need for assigning a DMAC index for transmission of RPC bits.

In a simultaneous cast mode, the AN assigns the AT the DMAC index for unicast transmission of the preamble and the forward traffic, and the BMAC and the MATI/BATI for multicast/broadcast transmission. The AN also assigns the DMAC index to the AT for RTC power control. Radio channels for unicast/broadcast transmission and RTC transmission are defined similarly to those in the first and second embodiments of the present invention.

Figure 50:
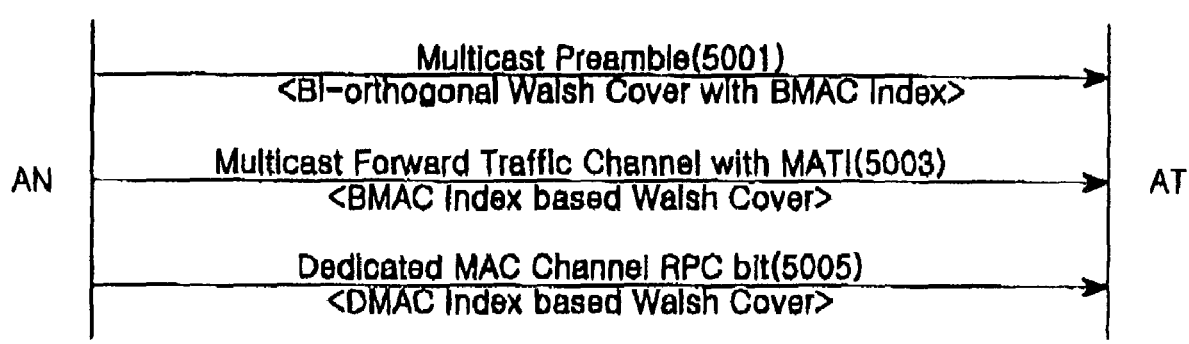
FIG. 50 illustrates forward interactive multicast transmission according to the third embodiment of the present invention.
Figure 51:
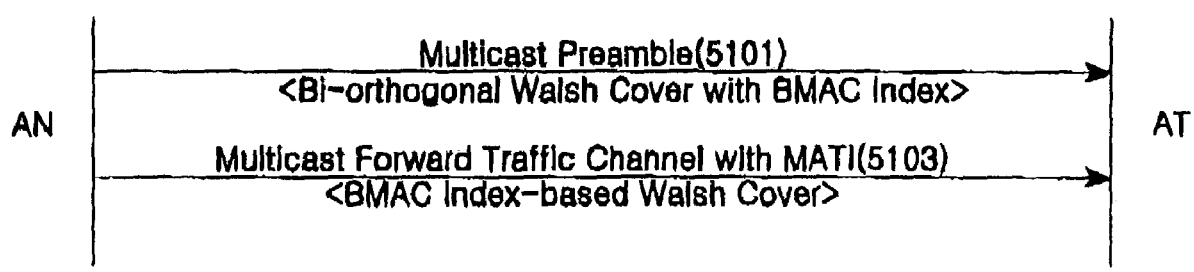
FIG. 51 illustrates forward non-interactive multicast transmission according to the third embodiment of the present invention.
Figure 52:
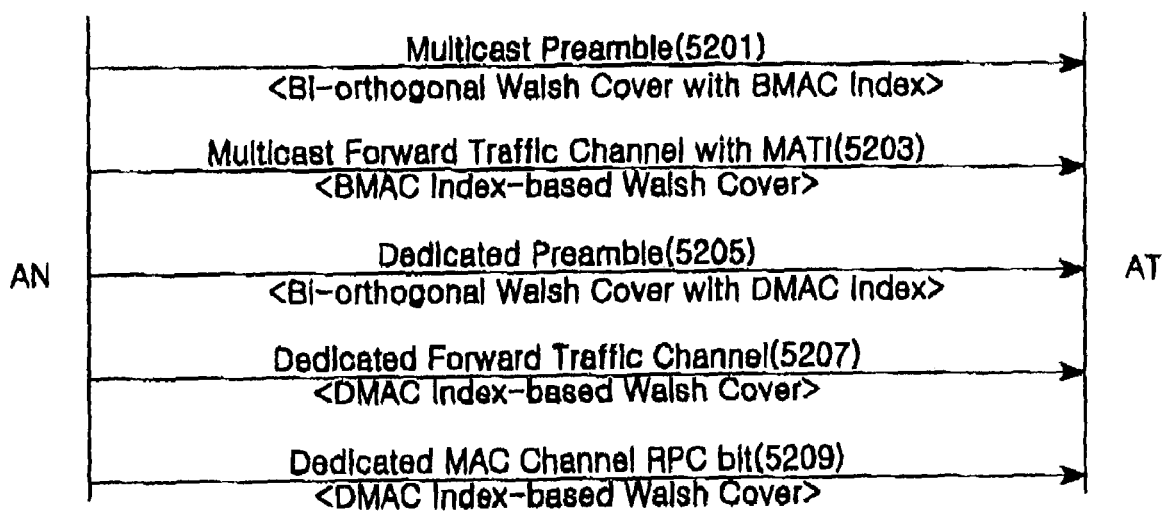
FIG. 52 illustrates forward simultaneous cast transmission according to the third embodiment of the present invention.

FIGS. 50, 51 and 52 illustrate forward transmissions of the preamble channel, the FTC, and the RPC bits on the RPC channel in interactive multicast, non-interactive multicast, and simultaneous cast transmission modes, respectively.

Referring to FIG. 50, for interactive multicast transmission, a preamble 5001 is covered with a Walsh code corresponding to a BMAC index and an FTC packet 5003 is transmitted on Walsh channels corresponding to the BMAC index with the MATI of a group to which the AT belongs. A DMAC index unique to the AT is used for RPC bits 5005, similarly to the unicast transmission mode.

Referring to FIG. 51, for non-interactive multicast transmission, the BMAC index is applied to a preamble 5101 and both BMAC index and MATI are used for an FTC packet 5103. Since no reverse transmission is carried out, there is no need for considering RPC bits. While not shown, the preamble is transmitted using the BMAC index and the FTC packet, using both BMAC index and BATI in a broadcast mode.

Referring to FIG. 52, in a simultaneous cast mode supporting unicast and multicast transmissions, if a preamble 5201 and an FTC packet 5203 are multicast, the preamble 5201 is covered with a Walsh code corresponding to the BMAC index. The FTC packet 5203 is covered with Walsh codes corresponding to the BMAC index and transmitted with the MATI set as a recipient to the AT. Alternatively, if a preamble 5205 and an FTC packet 5207 are unicast, the DMAC index is applied to them. In both cases, RPC bits 5209 are transmitted using the DMAC index. While not shown, in a simultaneous cast mode supporting unicast and broadcast transmissions, the BMAC index and BATI substitute for the BMAC index and MATI.

In accordance with various embodiments of the present invention, the conventional physical layer is modified and information required for multicast transmission is newly defined, so that the same data can be multicast to a plurality of ATs. For multicast forward transmission, a multicast forward channel rate is controlled in the following three ways, which will be described with reference to FIGS. 53, 54 and 55.

Figure 53:
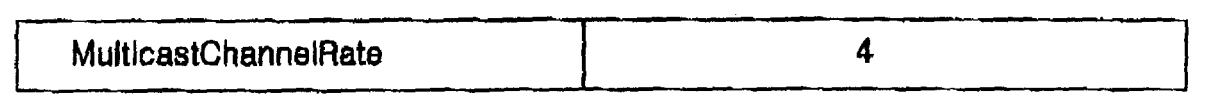

(1) In the first method for controlling a multicast forward channel rate all multicast forward traffic is delivered at a fixed rate. To do so, a MulticastChannelRate field illustrated in FIG. 53 is added to a parameter broadcasting message in order to define a multicast forward channel rate. A symbol mapped to a corresponding channel rate is set in the field. FIG. 54 illustrates channel rates and 4-bit symbols d0 to d3 mapped to the channel rates. The AN sets such a symbol in MulticastChannelRate of a parameter broadcasting message such as QuickConfig or SectorParameter. ATs receive multicast forward traffic at a channel rate corresponding to the symbol in the parameter broadcasting message.

(2) In the second method for controlling a multicast forward channel rate a different channel rate is assigned to each multicast group, so that the multicast group receives multicast traffic at the assigned fixed rate. This can be implemented by adding MulticastChannelRate to the GroupTrafficChannelAssignment message.

Figure 55:
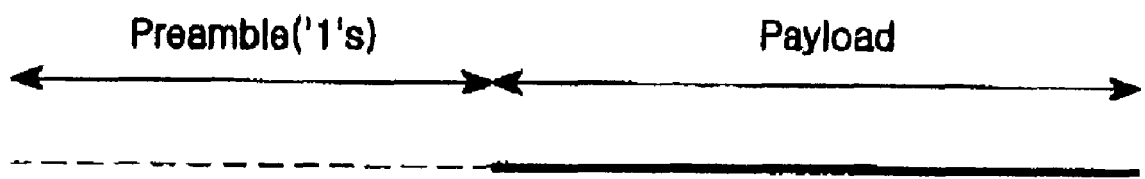
FIG. 55 illustrates a channel structure for dynamically changing a multicast forward channel rate according to the third embodiment of the present invention.

(3) In the third method for controlling a multicast forward channel rate channel rates are dynamically changed. As illustrated in FIG. 55, a preamble corresponding to a channel rate is delivered, followed by payload. Therefore, only when an AT successfully decodes the preamble, it receives forward traffic at the rate.

According to an exemplary embodiment of the present invention, assigning an index to each of the multicast groups further comprises receiving a multicast traffic channel request message from an MS, and assigning the multicast MAC (MMAC) index or MATI (Multicast Access Terminal Identifier) to each multicast group.

According to an exemplary embodiment of the present invention, assigning an index to each of the multicast groups further comprises assigning a dedicated MAC (DMAC) index or Uni-cast Access Terminal Identifier (UATI) to each multicast group, if the BS supports multicast and uni-cast transmissions simultaneously.

The embodiments of the present invention advantageously supports a one-to-many transmission through a multicast transmission, thereby overcoming the shortcomings of uni-cast and broadcast transmission schemes. In the embodiments of the present invention, an AN transmits the same data to the ATs of the same multicast group. Accordingly, the bandwidth of a network is saved, efficiency is increased, and network congestion is reduced. Also, reception of unnecessary data at the ATs is prevented. According to the embodiments of the present invention, various types of multicast transmission are supported.

While various embodiments of the present invention have been shown and described with reference to certain embodiments thereof, it will be understood by those skilled in the art that various changes in form and details may be made therein without departing from the spirit and scope of the invention as defined by the appended claims.

What is claimed is:

1. A method of multicasting packet data to mobile stations (MSs) of a multicast group in a base station (BS), the MSs of each multicast group receiving a same data, comprising:

assigning, by a Media Access Control (MAC) controller, an index to each of the multicast groups;

assigning, by the Media Access Control (MAC) controller, a physical layer channel corresponding to the index to each of the multicast groups to allow the MSs in the same multicast group to receive the same data; and transmitting, by a MODEM, the physical layer channel to each of the multicast groups;

wherein the step of assigning an index to each of the multicast groups comprises:

receiving a multicast traffic channel request message from an MS;

assigning a multicast Media Access Control (MMAC) index or MATI (Multicast Access Terminal Identifier) to each multicast group;

assigning primary and secondary reverse traffic addresses to the MS to distinguish between reverse traffic for a uni-cast service and reverse traffic for a multicast service, if the BS supports multicast and uni-cast transmissions simultaneously; and assigning a dedicated Media Access Control (DMAC) index used for power control or Uni-cast Access Terminal Identifier (UATI) to each multicast group, if the BS supports multicast and uni-cast transmissions simultaneously;

wherein the secondary traffic address is a secondary Uni-cast Access Terminal Identifier (UATI) assigned to the MS or a primary UATI with a classifier for distinguishing between uni-cast transmission and multicast transmission in a reverse traffic channel message.

2. The method of claim 1, wherein the primary traffic address is a primary Uni-cast Access Terminal Identifier (UATI) assigned to the MS by the Media Access Control (MAC) controller.

3. The method of claim 1, wherein the step of assigning the index to each of the multicast groups further comprising:

transmitting, by the Media Access Control (MAC) controller, to the MS a forward message including a multicast Media Access Control (MMAC) index or multicast access terminal identifier (MATI) assigned to each multicast group.

4. The method of claim 1, wherein the step of assigning the index to each of the multicast groups further comprising:

assigning, by the Media Access Control (MAC) controller, a dedicated Media Access Control (DMAC) index or Uni-cast Access Terminal Identifier (UATI) assigned to the MS, if the BS supports uni-cast and multicast transmissions simultaneously; and transmitting, by the Media Access Control (MAC) controller, to the MS a forward message including the DMAC index or the UATI assigned to the MS.

5. The method of claim 1, wherein the step of assigning the index to each of the multicast groups further comprising:

assigning, by the Media Access Control (MAC) controller, a primary and secondary reverse traffic addresses to distinguish between reverse traffic for a uni-cast service and reverse traffic for a multicast service, if the BS supports multicast and uni-cast transmissions simultaneously; and transmitting, by the Media Access Control (MAC) controller, to the MS a forward message including the primary and secondary reverse traffic addresses.

6. The method of claim 5, wherein the primary traffic address is a primary Uni-cast Access Terminal Identifier (UATI) assigned to the MS by the Media Access Control (MAC) controller.

7. A method of multicasting packet data to a group of mobile stations (MSs) in a base station (BS), comprising:
- dividing, by a Media Access Control (MAC) controller, a plurality of MSs in the BS into a plurality of primary multicast groups;
- dividing, by the Media Access Control (MAC) controller, a first multicast groups into secondary multicast groups, the MSs of each secondary multicast group receiving the same data;
- assigning, by the Media Access Control (MAC) controller, a primary index to the primary multicast group and a secondary index to the secondary multicast group;
- assigning, by the Media Access Control (MAC) controller, a primary physical layer channel corresponding to the primary index to each primary multicast group;
- assigning, by the Media Access Control (MAC) controller, a secondary physical layer channel corresponding to the secondary index to each secondary multicast group; and
- transmitting, by a MODEM, the primary or secondary physical layer channel to each multicast groups;
- wherein assigning a primary index to the primary multicast group and the secondary index to the secondary multicast group further comprising transmitting to the MS, a forward message including primary and secondary reverse traffic addresses to distinguish between reverse traffic for a uni-cast service and reverse traffic for a multicast service, if the BS supports multicast and uni-cast transmission simultaneously, wherein the secondary traffic address is a secondary Uni-cast Access Terminal Identifier (UATI) assigned to the MS or a primary UATI with a classifier, wherein the classifier is defined for distinguishing between uni-cast transmission and multicast transmission in a reverse traffic channel message;
- wherein the step of assigning the primary index to the primary multicast group and the secondary index to the secondary multicast group further comprises assigning a DMAC index used for a power control or Uni-cast Access Terminal Identifier (UATI) to the MS, if the BS supports uni-cast and multicast transmissions simultaneously.

8. The method of claim 7, wherein the primary index is a multicast Media Access Control (MMAC) index by the Media Access Control (MAC) controller.

9. The method of claim 7, wherein the secondary index is a multicast access terminal identifier (MATI) by the Media Access Control (MAC) controller.

10. The method of claim 7, wherein the step of assigning a secondary index to the secondary multicast group comprises:
- receiving, by the Media Access Control (MAC) controller, a multicast access terminal identifier (MATI) request message from an MS;
- transmitting, by the Media Access Control (MAC) controller, to the MS a MATI assignment message containing an MATI assigned to a multicast group to which the MS belongs; and
- transmitting, by the Media Access Control (MAC) controller, forward packet data to the MS with the MATI set as a recipient.

11. The method of claim 10, wherein the MATI request message includes multicast type information.

12. The method of claim 7, wherein the primary traffic address is a primary Uni-cast Access Terminal Identifier (UATI) assigned to the MS, by the Media Access Control (MAC) controller.

* * * * *